(12) United States Patent
Ueda et al.

(10) Patent No.: US 7,164,924 B2
(45) Date of Patent: Jan. 16, 2007

(54) LOCATION-BASED INFORMATION AND ACQUISITION METHOD

(75) Inventors: Fumio Ueda, Tokyo (JP); Mitsuo Shimotani, Tokyo (JP); Minoru Ozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/302,161

(22) Filed: Dec. 14, 2005

(65) Prior Publication Data

US 2006/0105781 A1    May 18, 2006

Related U.S. Application Data

(62) Division of application No. 10/149,154, filed on Jun. 10, 2002, now Pat. No. 7,003,288.

(51) Int. Cl.
    *H04Q 7/20* (2006.01)
(52) U.S. Cl. ............... 455/456.1; 455/403; 455/404.2
(58) Field of Classification Search ............ 455/456.1, 455/403, 404.2, 418, 424, 428, 435.2, 411
    See application file for complete search history.

(56) References Cited

U.S. PATENT DOCUMENTS

| | | | |
|---|---|---|---|
| 5,727,057 A | | 3/1998 | Emery et al. |
| 5,867,110 A | | 2/1999 | Naito et al. |
| 5,893,096 A | | 4/1999 | Nakamura |
| 5,911,773 A | | 6/1999 | Mutsuga et al. |
| 6,144,653 A | * | 11/2000 | Persson et al. ............. 370/337 |
| 6,249,740 B1 | | 6/2001 | Ito et al. |
| 6,324,467 B1 | | 11/2001 | Machii et al. |
| 6,557,029 B1 | | 4/2003 | Szymansky |
| 6,738,614 B1 | | 5/2004 | Blankenship et al. |
| 6,738,635 B1 | | 5/2004 | Lewis et al. |
| 6,757,719 B1 | | 6/2004 | Lightman et al. |
| 6,760,770 B1 | | 7/2004 | Kageyama |
| 2002/0055906 A1 | * | 5/2002 | Katz et al. ..................... 705/39 |
| 2003/0023694 A1 | | 1/2003 | Macor |
| 2003/0040272 A1 | * | 2/2003 | Lelievre et al. ............ 455/3.06 |

(Continued)

FOREIGN PATENT DOCUMENTS

EP    785 535    7/1997

(Continued)

OTHER PUBLICATIONS

Sato, K. et al.; "Proposal of an Algorithm for . . . Computer Systems", 6th World Congress on Intelligent Transport Systems, Toronto, Canada, Nov. 8-12, 1999.

*Primary Examiner*—Congvan Tran
(74) *Attorney, Agent, or Firm*—Leydig, Voit & Mayer, Ltd.

(57) ABSTRACT

A system for providing a mobile communication terminal, the position of which can be detected with location-based information that is associated with a detected position, and a method of service for providing the mobile communication terminal with the location-based information automatically and quickly by synchronizing with behavior of the mobile communication terminal. A location-based information intermediation method and a location-based information acquisition method are disclosed. Still further, the present invention provides the mobile communication terminal and the intermediation computer system for the method.

8 Claims, 22 Drawing Sheets

U.S. PATENT DOCUMENTS

| | | |
|---|---|---|
| 2004/0064565 A1* | 4/2004 | Batra et al. .................. 709/228 |
| 2004/0203900 A1* | 10/2004 | Cedervall et al. ........ 455/456.1 |

FOREIGN PATENT DOCUMENTS

| | | |
|---|---|---|
| JP | 9-33274 | 2/1997 |
| JP | 9-54895 | 2/1997 |
| JP | 9-257501 | 10/1997 |
| JP | 10-161534 | 6/1998 |
| JP | 10-307035 | 11/1998 |
| JP | 11-65434 | 3/1999 |
| JP | 11-160076 | 6/1999 |
| JP | 11-25093 | 9/1999 |
| JP | 11-250393 | 9/1999 |
| JP | 11-283183 | 10/1999 |
| JP | 2000-113388 | 4/2000 |
| JP | 2000-250842 | 9/2000 |
| JP | 2000-258172 | 9/2000 |
| JP | 2001-134618 | 5/2001 |

* cited by examiner

FIG.5

INFORMATION SOURCE AND DISTRIBUTION CONDITION BASIC DATA (AND CONTENT MANAGEMENT FILE)

| INFOR-MATION SOURCE NUMBER | DISTRIBUTION CONDITIONS ||||||
|---|---|---|---|---|---|---|
| | DISTRIBUTION AREA |||| (DISTRIBUTION TARGET) | OTHERS (TITLE ETC.) | INFORMATION ABOUT INFORMATION SOURCE (LOCATION); URL |
| | DISTRIBUTION POSITION || (DISTRIBUTION RADIUS) | (TRUE BEARING ANGLE) | | | |
| | LATITUDE (DEGREES, MINUTES, SECONDS) | LONGITUDE (DEGREES, MINUTES, SECONDS) | m | DEGREES | PEDESTRIAN/VEHICLE | | |
| 1 | x1 | y1 | r1 | a1 | VEHICLE | | url1 |
| 2 | x2 | y2 | r2 | a2 | PEDESTRIAN | | url2 |
| . | | | | | VEHICLE/PEDESTRIAN | | |

CONTINUATION OF INFORMATION SOURCE AND DISTRIBUTION CONDITION BASIC DATA (AND CONTENT MANAGEMENT FILE)

| INFOR-MATION SOURCE NUMBER | INFOR-MATION SOURCE URL | CONTENT SIZE | CONTENT CATEGORY (HIERARCHICAL ORDER) ||||| LINK EXISTS? | CONTENT PROVIDER | PROVISION STARTING DATE | LAST UP-DATING DATE | NAME AND ADDRESS OF REPRESENTATIVE ||||  OTHERS |
|---|---|---|---|---|---|---|---|---|---|---|---|---|---|---|---|---|
| | | | A | B | C | D | E | | | | | ADDRESS | NAME | TEL | E-MAIL | |
| 1 | URL1 | | | | | | | YES | CP1 | | | | | | | |
| 2 | URL2 | | | | | | | NO | CP2 | | | | | | | |
| . | | | | | | | | YES | CP3 | | | | | | | |

FIG.6

| DISTRIBUTION CONDITIONS | | | | INFORMATION SOURCE; URL (LOCATION) | |
|---|---|---|---|---|---|
| DISTRIBUTION AREA (IN CASE OF CIRCLE) | | | (IN CASE OF TRUE BEARING ANGLE INDICATED) | | |
| DISTRIBUTION POINT (CENTER) | | (IN CASE OF RADIUS INDICATED) | | | |
| LATITUDE | LONGITUDE | m | DEGREE | | |
| x1 | y1 | r1 | a1 | SHARED PART OF URL1 - URL5 | URL 1 EXCEPTING SHARED PART |
| x2 | y2 | r2 | a2 | | URL 2 EXCEPTING SHARED PART |
| x3 | y3 | r3 | a3 | | URL 3 EXCEPTING SHARED PART |
| x4 | y4 | r4 | a4 | | URL 4 EXCEPTING SHARED PART |
| xn | yn | r5 | a5 | | URL n EXCEPTING SHARED PART |

FIG.7

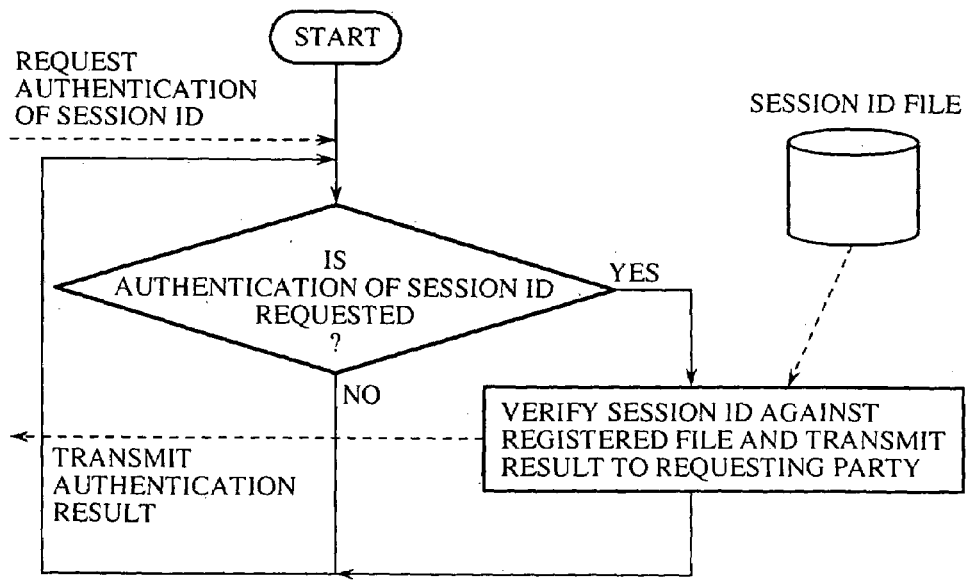

| CALCULATION FORMULAE OF DISTANCE $\Delta X_1$ BETWEEN PRESENT POSITION AND PREVIOUS SEARCH REQUEST CENTER POSITION AND SIMILAR DISTANCE $\Delta X_2$ AT SECOND PREVIOUS TIME | DETERMINATION CRITERIA FOR REQUESTING TIMING AT PRESENT TIME | SEARCH RADIUS REQUESTED AT PRESENT TIME $R_i$ | SEARCH POSITION REQUESTED AT PRESENT TIME $X_i, Y_i$ |
|---|---|---|---|
| $\Delta X_1$<br>$=((X-X_{i-1})^2+(Y-Y_{i-1})^2)^{1/2}$<br><br>$\Delta X_2$<br>$=((X-X_{i-2})^2+(Y-Y_{i-2})^2)^{1/2}$ | $(\Delta X_1 > K \cdot R_{i-1}) \cdots (1)$<br>AND<br>$(\Delta X_2 > K \cdot R_{i-2}) \cdots (2)$<br>ARE TRUE,<br>WHERE K=0~1.<br>THE CRITERIA MAY BE SET SO THAT IT WILL BE SATISFIED IF ONLY (1) IS TRUE.<br>IT IS MORE PREFERABLE TO ALTER K DEPENDING UPON THE MOVING SPEED. FOR EXAMPLE,<br>WHEN $\rho=1-K$,<br>$\rho \propto$ MOVING SPEED | IT MAY BE ALTERED ADAPTIVELY BY USING AN ACTUAL RESULT VALUE OF INFORMATION SOURCE DENSITY/NUMBER.<br>ASSUMING THAT THE NUMBER OF PREVIOUS INFORMATION SOURCE (LIST RECORD): N, AND PREVIOUS SEARCH REQUESTING RADIUS: $R_{i-1}$,<br>IF N<2, $R_i = 2 \cdot R_{i-1}$,<br>IF N>$N_{max}$, $R_i = R_{i-1}/2$,<br>IF $2 \leq N \leq N_{max}$, $R_i = R_{i-1}$.<br>WHEN THE REQUESTED AREA IS TWO-DIMENSIONAL, THE SEARCH REQUESTING AREA SHOULD BE PROPORTIONAL TO 1/2-TH POWER OF THE PLANE AREA SPECIFIED FOR THE SEARCH, AND THE REQUESTED AREA IS THREE-DIMENSIONAL, THE SEARCH REQUESTING AREA SHOULD BE PROPORTIONAL TO 1/3-TH POWER OF THE VOLUMETRIC AREA. | THIS VALUE IS ACQUIRED BY USING THE SEARCH REQUESTING RADIUS FOR THE PRESENT TIME.<br>THIS VALUE IS DEFINED TO BE A POSITION THAT MAY BE REACHED BY ADVANCING BY $R_i$ IN THE SAME DIRECTION FROM THE POSITION THAT IS BEYOND THE RANGE WITHIN THE DISTANCE $R_{i-1}$ MULTIPLIED BY K (THE POSITION OF THE PRESENT REQUESTING TIMING).<br>WHEN THE FIRST REQUEST IS MADE, THE PRESENT CENTER POSITION AND A PREDETERMINED RADIUS $R_1$ SHOULD BE USED. |

|  | SEARCH RANGE | |
|---|---|---|
|  | REQUESTING CENTER POSITION | REQUESTING RADIUS |
| PREVIOUS TIME | $X_{i-1}$ , $Y_{i-1}$ | $R_{i-1}$ |
| SECOND PREVIOUS TIME | $X_{i-2}$ , $Y_{i-2}$ | $R_{i-2}$ |

| PRESENT POSITION | X | Y |
|---|---|---|

FIG.8

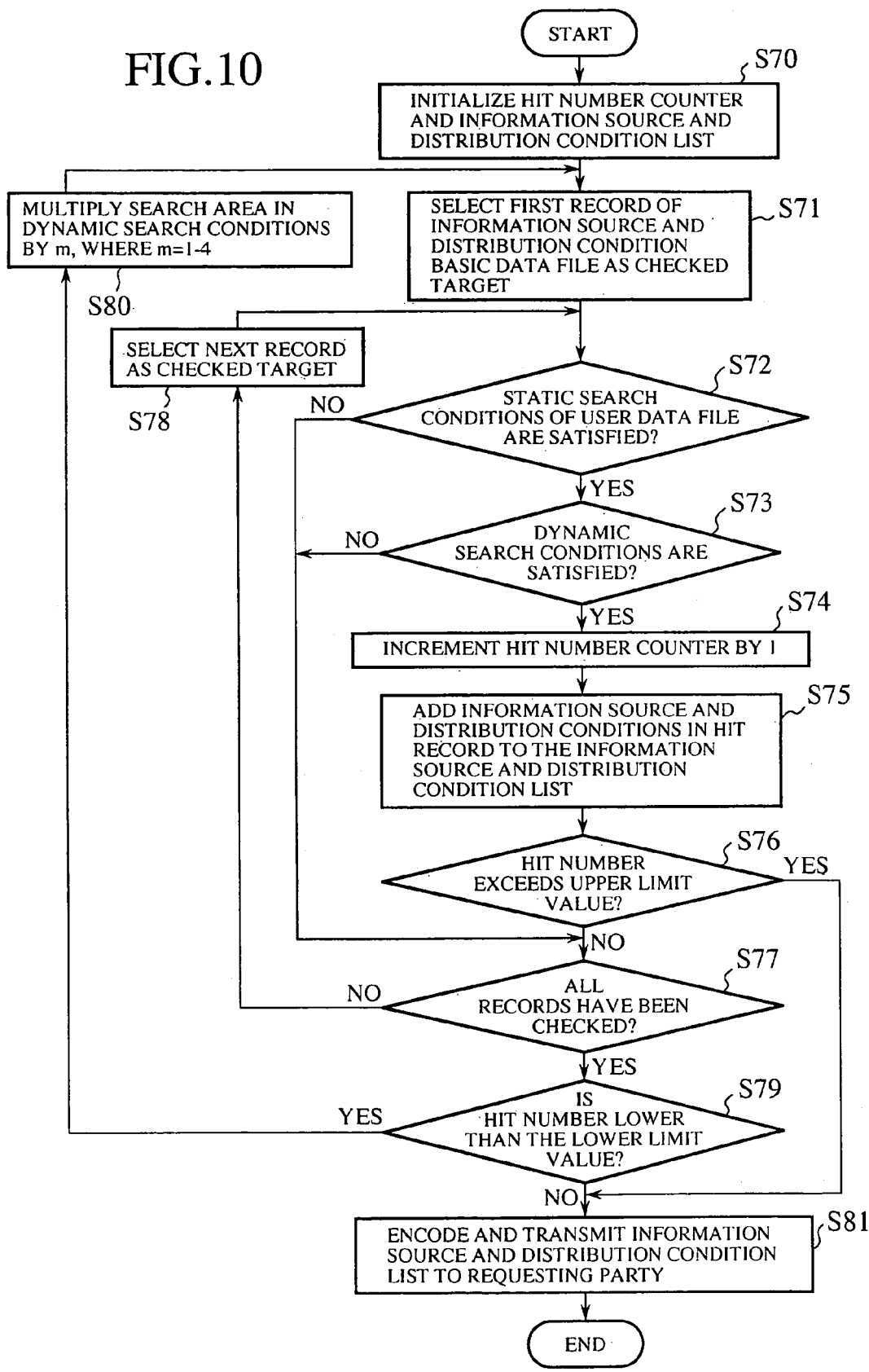

FIG.11

USER DATA FILE

| | USER ID | PASS-WORD | NAME | ADDRESS | TEL NUMBER | MAIL ADDRESS | SUB-SCRIPTION DATE | SUBSCRIBER SERVICE | | ... | BANK ACCOUNT NUMBER | | |
|---|---|---|---|---|---|---|---|---|---|---|---|---|---|
| | | | | | | | | A | B | | OWNERSHIP | CODE | NUMBER |
| 1 | U1 | | | | | | | BANKING | PROVIDED AUTOMATICALLY | | | | |
| 2 | U2 | | | | | | | | PROVIDED AUTOMATICALLY | | | | |
| 3 | U3 | | | | | | | | PROVIDED AUTOMATICALLY | | | | |
| 4 | U4 | | | | | | | MELODY | PROVIDED AUTOMATICALLY | | | | |
| 5 | U5 | | | | | | | | PROVIDED AUTOMATICALLY | | | | |
| 6 | U6 | | | | | | | | PROVIDED AUTOMATICALLY | | | | |
| 7 | . | | | | | | | STOCKS | | | | | |

CONTINUATION OF USER DATA FILE (AND SESSION ID FILE)

| | TERMINAL TYPE/MODEL | SELECTED MODE (TEMPORAL) | SEARCH CONDITIONS (DESIRED RECEPTION CATEGORY, HIERARCHICAL ORDER; TEMPORAL DATA | | | | SESSION ID |
|---|---|---|---|---|---|---|---|
| | | | CATEGORY | | | DESTI-NATION | |
| 1 | | PROVIDED AUTOMATICALLY | PERSONAL | SELECT ALL | — | — | |
| 2 | | PROVIDED AUTOMATICALLY | BUSINESS | SIGHTSEEING | SIGHTSEEING GUIDE | — | |
| 3 | | PROVIDED AUTOMATICALLY | PERSONAL | ITS | NAVIGATION | KYOTO | |
| 4 | | PROVIDED AUTOMATICALLY | BUSINESS | DISASTER PREVENTION | REFUGE GUIDANCE | — | |
| 5 | | PROVIDED AUTOMATICALLY | PERSONAL | EVENT | SITE GUIDANCE | — | |
| 6 | | PROVIDED AUTOMATICALLY | PERSONAL | PUBLIC TRANSPORTATION | BUS/TRAIN | UMEDA | |
| 7 | | J MODE | | GOURMET | JAPANESE CUISINE | — | |

FIG.14A

| SEARCH AREA (CIRCLE) | | | | OTHER CONDITIONS | | | | SEARCH REQUESTING ORDER |
|---|---|---|---|---|---|---|---|---|
| SEARCH POSITION (CENTER) | | SEARCH RADIUS | MOVING DIRECTION | CONTENT CATEGORY (UPPER LAYER) | | | | |
| LATITUDE | LONGITUDE | m | DEGREE | TOP LAYER | SECOND LAYER | THIRD LAYER | ... | |
| X1 | Y1 | R1 | A1 | PERSONAL USE | GOURMET | JAPANESE CUISINE | – | LATEST (PRESENT TIME) |
| X2 | Y2 | R2 | A2 | PERSONAL USE | GOURMET | – | – | PREVIOUS TIME |
| X3 | Y3 | R3 | A3 | PERSONAL USE | SELECT ALL | – | – | SECOND PREVIOUS TIME |
| | | | | | | | | |

DYNAMIC SEARCH CONDITIONS

FIG.14B

| SEARCH AREA (DEFINED BY SEARCH CENTER POSITION, RADIUS IS MANAGED BY INTERMEDIATION COMPUTER) | | OTHER CONDITIONS | | |
|---|---|---|---|---|
| | | CONTENT CATEGORY | | |
| LATITUDE | LONGITUDE | TOP LAYER | SECOND LAYER | ... |
| X1 | Y1 | PERSONAL USE | GOURMET | JAPANESE CUISINE |

DYNAMIC SEARCH CONDITIONS

FIG.14C

| SEARCH AREA (CIRCLE) | | | MOVING DIRECTION |
|---|---|---|---|
| SEARCH POSITION (CENTER) | | SEARCH RADIUS | |
| LATITUDE | LONGITUDE | m | DEGREE |
| X1 | Y1 | R1 | A1 |

DYNAMIC SEARCH CONDITIONS

LOCATION-BASED INFORMATION AND ACQUISITION METHOD

This disclosure is a division of U.S. patent application Ser. No. 10/149,154, filed Jun. 10, 2002, now U.S. Pat. No. 7,003,288.

TECHNICAL FIELD

The present invention relates to a location-based information intermediation and acquisition method, and more particularly, it relates to a method for acquiring location-based information that is in relation to a detected position in a mobile communication terminal the position of which is detectable, a method for, intermediation service that synchronizes with behavior of the mobile communication terminal and provides a mobile communication terminal with the location-based information that is in relation to a position of the mobile communication terminal among a plurality of pieces of location-based information provided on a network through support of a intermediation computer system, and the mobile communication terminal for utilizing such service, or the intermediate computer system for supporting in providing the service.

BACKGROUND ART

Four examples of prior art location-based information acquisition methods are now described.

Prior art 1 (JP-A 160076/1999) discloses a navigation unit that communicates with a destination facility (e.g. a restaurant) to send a predetermined message about a user name, reservation request and so on by e-mail when a vehicle on which the unit is mounted reaches within a predetermined distance from the destination facility on a map installed on the unit or the time required to reach the destination facility comes to a predetermined value.

However, in the navigation unit shown in the prior art example 1 there is a problem that its application is restricted or impractical since its terminal cannot know information about the facility that may be updated daily on the move automatically, moreover an address of the destination facility must be set in the navigation unit in advance, and therefore the navigation unit cannot cope with such changes as closing or establishment of facilities or alternation of the contents of the service provided.

Prior art 2 (ITS Congress '99 "Proposal of an Algorithm for Transmission and Cache of Location Dependent Data for In-Vehicle Computer System") discloses another navigation unit that receives a series of information that is necessary for driving such as landmarks located in the traveling direction, maps and so on successively when the vehicle reaches predetermined positions. This unit receives the series of information that is transmitted from a database through networks by way of radiowave transmission facilities and so on placed along roads everywhere. Furthermore, as an extension of this method, this unit obtains data on positions along a planned route in advance and in a unit. This configuration, may solve the problem that if the data concerning the planned route has not been obtained in advance, too much time may be taken to retrieve data concerning landmarks, maps and so on in a database after the vehicle has arrived a predetermined positions, and to receive and display the data. Therefore, the data may be displayed only after the vehicle has passed the position corresponding to the data.

However, the method as shown in prior art 2 may have the following problems when the vehicle changes its route or stops driving:

(1) Communication may often be performed uselessly (communication costs may often be wasted);

(2) An extra memory is needed in every navigation unit to store data for, e.g., four nodes (crossovers) in advance;

(3) This method cannot be adapted when the driving route has not been fixed beforehand;

(4) Since it is not indicated who prepares and updates a database, this method may lack in operational feasibility;

(5) Since the contents of the database are permanent, the navigation Unit according to this method is totally equal in terms of functions to the conventional navigation units that store the map database on a storage device such as a CD-ROM or a DVD permanently.

Next, prior art 3 (JP-A 307035/1998) discloses a system for determining a position of a vehicle equipped with a (GPS) Global Positioning System receiver at a center and informing the vehicle of appearance of an information providing spot in the neighborhood of the vehicle by any communicating means. For example, in this system, the center monitors when a landmark, such as a gas station, approaches and informs the vehicle of that situation by telephone, FAX or a pager and the like.

However, the system shown in prior art 3 has a problem that significant communication costs are wasted uselessly since the vehicle must transmit location information to the center continuously regardless of presence of the landmark in the neighborhood. Further, since conventional navigation units have already implemented a function to notify to the vehicle of the approach of the landmark (the gas station in this example) by setting the gas station as a passing point, there is no need to take a trouble to communicate with the center. Moreover, in this system shown in prior art 3, the mobile communication terminal cannot know information that is provided by facilities and that would be updated daily such as, for example, "today's gasoline price—90 yen/liter, Aug. 10, 2000".

In addition, there has been another prior art wherein a mobile communication terminal unit that comprises a (PDA) personal digital assistant or a notebook PC equipped with communicating means such as a cellular phone or a PHS and so on, and position detecting means such as a GPS receiver and so on retrieves a facility such as a restaurant in the vicinity of the retrieving point on the Internet and displays the facility on a map in an overlapping manner. This system is intended to simply check whether there is a desired facility in the vicinity of a given position. The system may further be configured to display a detailed description when the user selects a mark of a particular facility.

However, the system described above has a problem that time-consuming manual operations and retrieval are needed to acquire information since the mobile communication terminal unit must access and retrieve sites on the Internet sequentially by manual operation while the mobile communication terminal unit moves. Further, it is not feasible because it may not be safe to operate the mobile communication terminal unit continuously while driving. Still further, timing to acquire the information may often be delayed in such system.

Each of the prior art location-based information acquisition methods as described above simply provides so-called landmark displaying function that gives notice when a predetermined destination facility approaches, or simply checks whether there is a desired type of facilities such as shops and restaurants in the neighborhood. Therefore, the information that is provided by the facilities and that would be updated daily or momentarily such as "today's articles for special sale till 5:00 p.m. are . . ." cannot be recognized automatically and quickly just prior to passing in front of the facilities. Further, in such prior art methods, it is impossible to acquire peripheral information about the area where the vehicle enters successively and automatically.

In view of the foregoing, this invention has been made, and it is an object of this invention to solve the problems described above and provide a location-based information intermediation and acquisition method that can access a desired information source by synchronizing with behavior such as a present position or a moving bearing angle, and acquire location-based information (contents) automatically and quickly. Further, this invention provides a mobile communication terminal and an intermediation computer system for implementing such method.

DISCLOSURE OF INVENTION

A location-based information intermediation and acquisition method according to the present invention, in which an intermediation computer system on a network intermediates location-based information provided on the network and a mobile communication terminal on the network acquires the desired location-based information that synchronizes with behavior of the mobile communication terminal in itself by means of the intermediation, includes the steps of:

in the intermediation computer system, transmitting to the mobile communication terminal an information source and distribution condition list that associates a location on the network of an information source having the location-based information that corresponds to specific search conditions with distribution conditions that include a distribution area of the location-based information; and in the mobile communication terminal, verifying, for each information source, behavior of the mobile communication terminal against the distribution conditions of the information source indicated in the received information source and distribution condition list, and then receiving and presenting the location-based information by accessing the verified information source.

With this configuration, there is an effect that a desired information source may be accessed by synchronizing with the behavior such as the present position or the moving bearing angle to acquire the location-based information (the contents) automatically quickly.

Further, a location-based information intermediation method according to the present invention includes the step of transmitting to a mobile communication terminal an information source and distribution condition list that associates a location on a network of an information source having predetermined location-based information that corresponds to specific search conditions with distribution conditions that include a distribution area of the location-based information.

With this configuration, there is an effect that the content server on the network can provide the specific mobile communication terminal with desired location-based information quickly.

Still further, a location-based information intermediation method according to the present invention further includes the step of creating the information source and distribution condition list that corresponds to the specific search conditions by searching a database that stores basic data that associates the location on the network of the information source having the location-based information with the distribution conditions that include the distribution area of the location-based information.

With this configuration, there is an effect that it is possible to create the list that accommodates various requirements and transmit the list to the mobile communication terminal.

Also, there is an effect that the database that is used for other purposes such as a content provider database and an administrator database may be diverted to the purpose of the intermediation support.

Still further, an intermediation computer system according to the present invention includes: a communicating unit for communicating with a terminal on a network; a database for storing basic data that associates a location on a network of an information source having location-based information that is provided on the network with distribution conditions that include a distribution area of the location-based information; and a processing unit for performing operation to read the basic data that corresponds to the search conditions from the database when the communicating unit receives search conditions for the location-based information from the terminal, creating a information source and distribution condition list that is comprised of the read basic data and then transmitting the basic data through the communicating unit to a particular mobile communication terminal.

With this configuration, there is an effect that the intermediation computer system can create the list that accommodates various requirements and transmits the list to the mobile communication terminal, and the content server on the network can provide the particular mobile communication terminal with the desired location-based information quickly.

Also, there is an effect that the database that is used for other purposes such as a content provider database and an administrator database may be diverted to the purpose of the intermediation support.

Still further, an intermediation computer system according to the present invention includes: a communicating unit for communicating with a terminal on a network; a database for storing an information source and distribution condition list that associates allocation on a network of an information source having predetermined location-based information that is provided on the network with distribution conditions that include a distribution area of the location-based information; and a processing unit for performing an operation to read the information source and distribution condition list that corresponds to the search conditions from the database when the communicating unit receives search conditions for the location-based information from the terminal and to transmit the read information source and distribution condition list through the communicating unit to a particular mobile communication terminal.

With this configuration, there is an effect that the intermediation computer system can transmit the desired list to the mobile communication terminal quickly, and the content server on the network can provide the particular mobile communication terminal with the desired location-based information quickly.

Still further, a location-based information acquisition method according to the present invention includes the steps of: receiving from outside an information source and distribution condition list that associates a location on a network of an information source having predetermined location-based information with distribution conditions that include a distribution area of the location-based information; and verifying, for each information source, behavior of a mobile communication terminal including its location against the distribution conditions of the information source indicated in the received information source and distribution condition list, and then receiving and presenting the location-based information by accessing the verified information source.

With this configuration, there is an effect that the location-based information may be acquired and provided successively automatically by synchronizing with the behavior of the mobile communication terminal and just at the relevant position.

Still further, a location-based information acquisition method according to the present invention includes the steps of: requesting an intermediation computer system to provide intermediation support in connection with predetermined location-based information while attaching search conditions for the location-based information provided on a network; receiving an information source and distribution condition list that associates a location on a network of an information source having the predetermined location-based information with distribution conditions that include a distribution area of the location-based information from the intermediation computer system via the network; and verifying, for each information source, behavior of a mobile communication terminal including its location against the distribution conditions of the information source indicated in the received information source and distribution condition list, and then receiving and presenting the location-based information by accessing the verified information source.

With this configuration there is an effect that the location-based information may be acquired and provided successively automatically by synchronizing with the behavior of the mobile communication terminal and just at the relevant position.

Also, there is an effect that each mobile communication terminal can acquire the list that meets various requirements.

Still further, in the above described location-based information acquisition method according to the present invention, the search conditions are updated automatically as the mobile communication terminal moves.

With this configuration, there is an effect that the location-based information may be acquired and provided successively automatically by synchronizing with the behavior of the mobile communication terminal and just at the relevant position without inputting search conditions newly.

Still further, the above described location-based information acquisition method according to the present invention further includes the step of presenting a screen for inputting the search conditions, wherein the search conditions are specified through the inputting screen to request provision of intermediation support.

With this configuration, there is an effect that the location-based information may be acquired and provided successively automatically by synchronizing with the behavior of the mobile communication terminal and just at the relevant position.

Still further, in the above described location-based information acquisition method according to the present invention, when the behavior of the mobile communication terminal including a location thereof is verified against the distribution conditions indicated in the information source and distribution condition list for each information source, if a plurality of information sources that conforms to one another is found, the location-based information of the plurality of information sources is displayed on a plurality of screens, and at the same time, which plurality of screens is displayed so that it can be viewed simultaneously.

With this configuration, there is an effect that the information from the plurality of information sources may be acquired and the displaying screen may be more obvious for the user.

Still further, a mobile communication terminal according to the present invention includes: a communicating unit for communicating with an information source having location-based information; a processing unit for verifying, for each information source, behavior including its location against distribution conditions indicated in an information source and distribution condition list that associates a location on a network of an information source having predetermined location-based information that is input from outside with the distribution conditions that include a distribution area of the location-based information, and for accessing the verified information source via the communication unit; and a presenting unit for presenting the location-based information that is received from the information source.

With this configuration, there is an effect that the mobile communication terminal may be provided wherein the mobile communication terminal can acquire and provide the location-based information successively automatically by synchronizing with the behavior of the mobile communication terminal and just at the relevant position.

Still further, a mobile communication terminal of the present invention includes: a communicating unit for communicating with an intermediation computer system on a network and information source having location-based information; a processing unit for verifying, for each information source, own behavior including its location against distribution conditions indicated in an information source and distribution condition list that associates a location on a network of an information source having predetermined location-based information that is input via the network with the distribution conditions that include a distribution area of the location-based information and for accessing the verified information source via the communicating unit; and a presenting unit for presenting the location-based information that is received from the information source, wherein the processing unit includes a means for requesting an intermediation computer system to provide the information source and distribution condition list about the predetermined location-based information while attaching search conditions for the location-based information provided on the network.

With this configuration, there is an effect that the mobile communication terminal may be provided wherein the mobile communication terminal can acquire and provide the location-based information successively automatically by synchronizing with the behavior of the mobile communication terminal and just at the relevant position.

Also, there is an effect that each mobile communication terminal can acquire the list that meets various requirements.

Still further, the above described mobile communication terminal according to the present invention updates the search conditions automatically and requests provision of the information source and distribution condition list as the mobile communication terminal moves.

With this configuration, there is an effect that the location-based information may be acquired successively automatically by synchronizing with the behavior of the mobile communication terminal and just at the relevant position without inputting search conditions newly.

Still further, the above described mobile communication terminal according to the present invention requests provision of intermediation support by specifying the search conditions through an input screen for inputting the search conditions.

With this configuration, there is an effect that the desired location-based information may be acquired and provided successively and automatically by synchronizing with the behavior of the mobile communication terminal and just at the relevant position.

Still further, the above described location-based information intermediation method according to the present invention further includes the step of transmitting an information source and distribution condition list concerning predetermined location-based information when receiving a request to transmit such information source and distribution condition list with the specific search conditions from any client computer via the network.

With this configuration, there is an effect that the content server on the network can provide the specific mobile communication terminal with the location-based information in response to the request from any client on the network.

Still further, the above described location-based information intermediation method according to the present invention further includes the step of transmitting to the mobile communication terminal an information source and distribution condition list concerning a search-target area defined by a search center position and range information specified along with the search center position or predetermined range information when the search-target area is specified as the search conditions and the search-target area is defined at least by the search center position.

With this configuration, there is an effect that a burden to the mobile communication terminal may be alleviated. More specifically, there is an effect that the mobile communication terminal can perform a procedure for specifying the search-target area or data calculation relatively easily by specifying the range to be searched by the center position, therefore waste of computation, memory and communication resources may be minimized.

Still further, the above described location-based information intermediation method according to the present invention further includes the step of transmitting to the mobile communication terminal an information source and distribution condition list that is created by excluding the search result based upon the previous search conditions from the search result based upon the present search conditions when a search-target area is specified as the search conditions and a plurality of the search-target area is input successively.

With this configuration, there is an effect that a burden to the mobile communication terminal may be alleviated. More specifically, there is an effect that the mobile communication terminal does not have to receive the information source that is included in the search-target range specified at the previous time twice. Also, there is an effect that an amount of data transferred via the network may not increase unnecessarily.

Still further, the above described location-based information intermediation method according to the present invention further includes the step of terminating a search if the number of information sources in the acquired information source and distribution condition list exceeds a predetermined upper limit when the information source and distribution condition list corresponding to the search conditions is searched and created, or expanding a search-target area if the number of the information sources in the acquired information source and distribution condition list is less than a predetermined lower limit.

With this configuration, there is an effect that the appropriate number of the information sources may be provided.

Still further, the above described location-based information intermediation method according to the present invention further includes the steps of searching a route from the present position to a destination of the mobile communication terminal and transmitting to the mobile communication terminal the information sources and distribution condition list along the route shown by the searched route information when the present position and the destination are specified as the search conditions.

With this configuration, there is an effect that the information source and distribution condition list for a wide range up to the destination and its vicinity may be provided.

Still further, the above described location-based information intermediation method according to the present invention further includes the step of expressing a shared portion of characters, figures or symbols that are representative of an information'source or distribution conditions and transmitting only an unshared portion correspondingly and in a separate manner when the characters, figures or symbols have the shared portion with regard to either the information source or the distribution conditions in the step of transmitting the information source and distribution condition list.

With this configuration, there is an effect that an amount of transferred data as well as time and costs for communication may be reduced.

Still further, the above described location-based information intermediation method according to the present invention further includes the step of billing a provider of predetermined contents depending either upon whether a registered terminal has accessed the predetermined contents, or upon the number of access by the registered terminal to the predetermined contents.

With this configuration, there is an effect that a predetermined charge may be billed from the content providers who expect a profit by providing mobile communication terminals in a distribution area with contents.

Still further, the above described location-based information intermediation method according to the present invention further includes the step of billing a registered terminal depending upon the number of access in which the registered terminal has received the information source and distribution condition list.

With this configuration, there is an effect that a predetermined charge may be billed from the client or the mobile communication terminal user that utilizes the location-based information or the intermediation service to provide the location-based information.

Still further, the above described mobile communication terminal according to the present invention specifies a search-target area as the search conditions and updates the search-target area automatically as the mobile communication terminal moves.

With this configuration, there is an effect that the search-target area may be updated automatically and new lists may be received successively as the mobile communication terminal moves and without inputting the search-target area newly.

Still further, the above described mobile communication terminal according to the present invention specifies a particular search-target area as the search conditions and specifies the particular search-target area through an input screen.

With this configuration, there is an effect that the list for the particular search-target area may be acquired at any point of time and in that the mobile communication terminal may access the information source and present the information when it enters the distribution area of the information source contained in the list, therefore the necessary location-based information may be acquired at the optimal position automatically.

Still further, the above described mobile communication terminal according to the present invention specifies a particular type of the location-based information as the search conditions and specifies the particular type of the location-based information through an input screen.

With this configuration, there is an effect that the mobile communication terminal may be acquired the list for acquiring the location-based information that-is restricted in the particular type at any point.

Still further, the above described mobile communication terminal according to the present invention specifies its own present position and destination as the search conditions through an input screen.

With this configuration, there is an effect that the information source and distribution condition list may be obtained for a wide range up to the destination and its vicinity in advance.

Still further, the above described mobile communication terminal according to the present invention specifies the search-target area at least by a search center position.

With this configuration, there is an effect that a procedure for specifying the search-target area or data calculation may be relatively simple and therefore waste of computation, memory and communication resources may be minimized.

Still further, the above described mobile communication terminal according to the present invention specifies a new search-target area that is an area where the mobile communication terminal should reach by moving a predetermined distance according to a moving history of the mobile communication terminal.

With this configuration, there is an effect that the list of the information source that belongs to the area to which the mobile communication terminal is likely to move in a restricted manner.

Still further, in the above described mobile communication terminal according to the present invention, the processing unit further includes means for altering a size of a search-target area according to the number of the information sources in the information source and distribution condition list that has been received on or before the previous time and specifying the size of the search-target area as the search conditions for the next search.

With this configuration, there is an effect that the information source and distribution condition list having the more suitable number of the information sources may be acquired at the present time if the too many or too little number of the information sources was acquired at the previous time.

Still further, in the above described mobile communication terminal according to the present invention, the processing unit further includes means for specifying a new search-target area as the search conditions and requesting the information source and distribution condition list before the present position of the mobile communication terminal leaves the search-target area that has been specified at the previous time.

With this configuration, there is an effect that a possibility that the information about the information source to be acquired is lost may be reduced.

Still further, in the above described mobile communication terminal according to the present invention, the processing unit further includes means for specifying the search-target area at the present time and the search-target area at the previous time as the search conditions simultaneously.

With this configuration, there is an effect that it is not necessary to receive the information source that has been included in the search area specified at the previous time again. Also, there is an effect that it is not necessary to increase an amount of data transferred via the network uselessly.

Still further, the above described mobile communication terminal according to the present invention further includes a navigation unit, wherein the processing unit further includes means for specifying the search-target area along a route indicated by route information that has retrieved by a destination as the search conditions and requesting the intermediation computer system to provide intermediation support for predetermined location-based information.

With this configuration, there is an effect that the information source and distribution condition list for a more appropriate range may be acquired and the number of issue of the search requests may be reduced.

Still further, in the above described mobile communication terminal according to the present invention, the processing unit further includes means for predicting a position of the mobile communication terminal based upon a moving history of the mobile communication terminal and then initiating access to the information source that corresponds to distribution conditions in the information source and distribution condition list when the predicted position conforms to any of the distribution conditions.

With this configuration, there is an effect that the mobile communication terminal may initiate access to the information source in advance in consideration of the predicted position corresponding to the moving speed of the mobile communication terminal, and therefore the corresponding location-based information may be presented in a timely fashion.

Still further, in the above described mobile communication terminal according to the present invention, the processing unit further includes means for predicting a position of the mobile communication terminal based upon a moving history of the mobile communication terminal and simultaneously altering the position to be predicted depending upon a data size of the location-based information, and then initiating access to the information source that corresponds to any of distribution conditions in the information source and distribution condition list when the altered predicted position conforms to the distribution conditions.

With this configuration, there is an effect that the mobile communication terminal may initiate access to the information source in advance for the predicted position according to the data size, and therefore the corresponding location-based information may be presented in a timely fashion.

Still further, in the above described mobile communication terminal according to the present invention, the processing unit further includes means for altering the distribution area of the location-based information in the information source and distribution condition list depending upon the data size of the location-based information, verifying, for each information source, the position of the mobile communication terminal against the altered distribution area, and then accessing the verified information source.

With this configuration, there is an effect that the mobile communication terminal may initiate access to the information source according to the data size, and therefore the corresponding location-based information may be presented in a timely fashion.

Still further, in the above described mobile communication terminal according to the present invention, the processing unit further includes means for altering the distribution area of the location-based information in the information source and distribution condition list depending upon a moving speed of the mobile communication terminal, verifying, for each information source, the position of the mobile communication terminal against the altered distribution area, and then accessing the verified information source.

With this configuration, there is an effect that the mobile communication terminal may initiate access to the information source according to the moving speed of the mobile communication terminal, and therefore the corresponding location-based information may be presented in a timely fashion.

Still further, the above described mobile communication terminal according to the present invention further includes means for defining an expanded distribution area by expanding the distribution area for the location-based information in the information source and distribution condition list, and initiating access to the information source that corresponds to the expanded distribution area if the position of the mobile communication terminal conforms to the expanded distribution area, or presenting the location-based information of the information source if the present position of the mobile communication terminal conforms to the distribution position before extension.

With this configuration, there is an effect that the mobile communication terminal may present the location-based information in a timely manner.

Still further, the above described mobile communication terminal according to the present invention further includes means for allowing the acquired location-based information to be overwritable by releasing the acquired location-based information from a memory when the present position of the mobile communication terminal leaves the expanded distribution area.

With this configuration, there is an effect that the buffer memory for storing the contents may be released and utilized efficiently, and moreover, it is not necessary to receive the contents repeatedly when the mobile communication terminal enters the distribution area twice.

Still further, in the above described mobile communication terminal according to the present invention, the processing unit further includes means for verifying, for each information source, behavior of the mobile communication terminal including its location against the distribution conditions of the information source indicated in the received information source and distribution condition list, and accessing the information source that conforms to the distribution conditions if the behavior conforms to the distribution conditions and the location-based information is not stored in a memory for such purpose.

With this configuration, there is an effect that it is not necessary to access the information source the location-based information of which is already stored many times wastefully successively.

Still further, another mobile communication terminal according to the present invention includes an input screen for issuing a request for transmission of a program to an application server on a network, which program being executed for receiving an information source and distribution condition list that associates a location on the network of an information source having predetermined location-based information with distribution conditions that include a distribution area of the location-based information, verifying, for each information source, behavior including a location of the mobile communication terminal against the distribution conditions indicated in the received information source and distribution condition list; and means for initiating the program after receiving the program.

With this configuration, there is an effect that an application program may be downloaded and executed at any time as needed so that the limited memory resources in the mobile communication terminal may be used for various uses including the application programs. Also, there is an effect that the functions of the mobile communication terminal may be added/modified arbitrarily.

Still further, in the above described location-based information intermediation and acquisition method according to the present invention, the intermediation computer system transmits distribution bearing angle information that limits a moving direction of the mobile communication terminal as one of the distribution conditions in the information source and distribution condition list to the mobile communication terminal, and the mobile communication terminal verifies the moving direction of the mobile communication terminal against the distribution bearing angle in the information source and distribution condition list, accesses the information source that conforms to the distribution conditions to receives the location-based information for presentation.

With this configuration, there is an effect that it is not necessary to access the location-based information that is not intended for distribution wastefully.

BRIEF DESCRIPTION OF DRAWINGS

FIG. 5 is a diagram showing an example of information source and distributing conditions basic data according to the first embodiment of the present invention;

FIG. 6 is a diagram showing an example of an information source and distributing condition list according to the first embodiment of the present invention;

FIG. 7 is a flowchart showing operations of an authentication server according to the first embodiment of the present invention;

FIG. 8 is a diagram showing timing determination criteria when requesting the information source and distributing condition list continuously, and an operational algorithm for a radius and a center position of a search-target area requested at the present time according to the first embodiment of the present invention;

FIG. 10 is a detailed flowchart showing S52 in FIG. 2;

FIG. 11 is a diagram showing an example of a user data file according to the first embodiment of the present invention;

FIGS. 14A–14C are diagrams showing an example of dynamic search criteria according to a third embodiment;

BEST MODE FOR CARRYING OUT THE INVENTION (First Embodiment)

Hereinafter, a first embodiment of the present invention will be described with reference to drawings.

Figure 1:
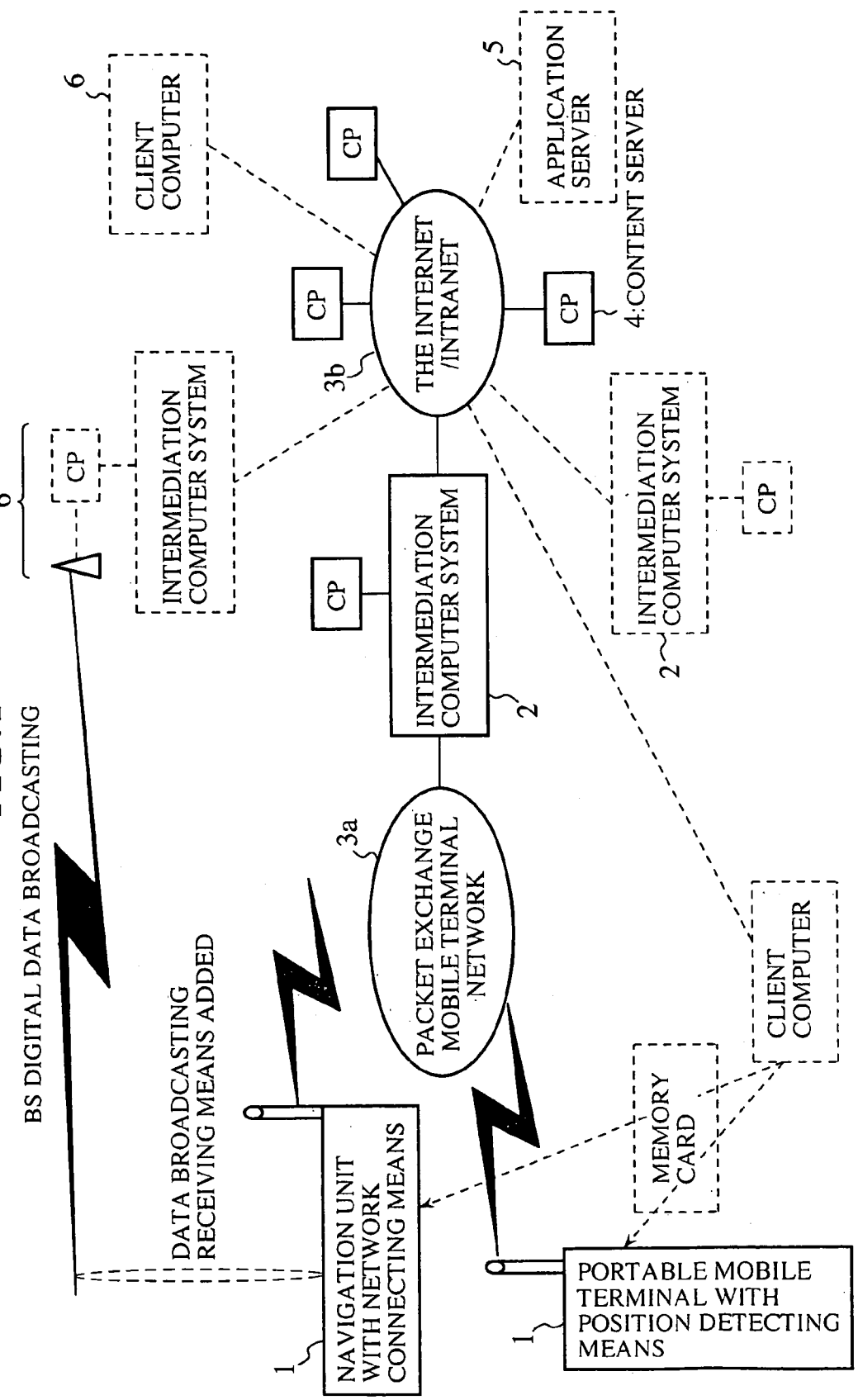
FIG. 1 is a block diagram showing a network system according to a location-based information intermediation and acquisition method of a first embodiment of the present invention.
Figure 2:
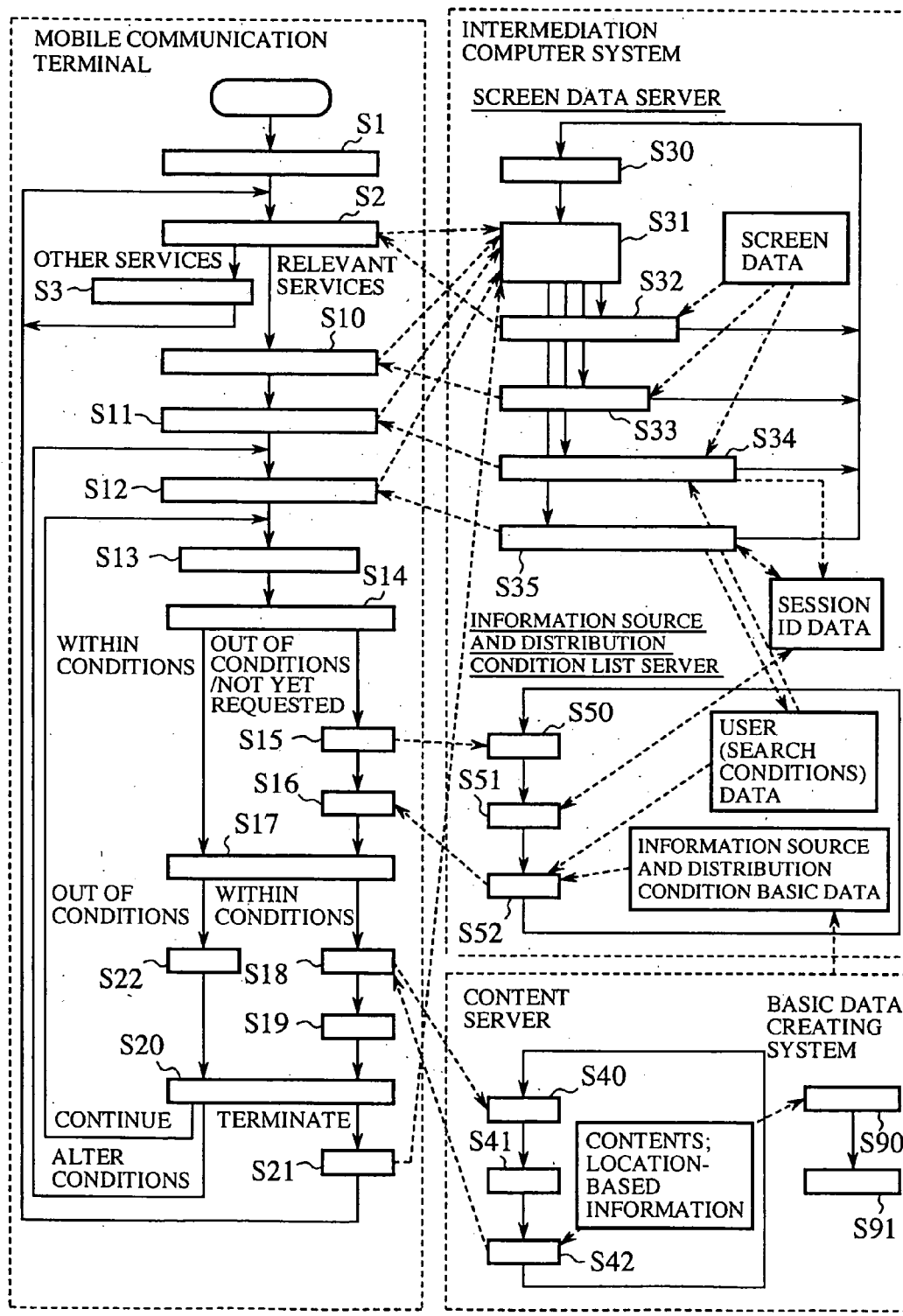
FIG. 2 is a flowchart showing operations of a mobile communication terminal, an intermediation computer system and a content server in the location-based information intermediation and acquisition method of the first embodiment of the present invention.
Figure 3:
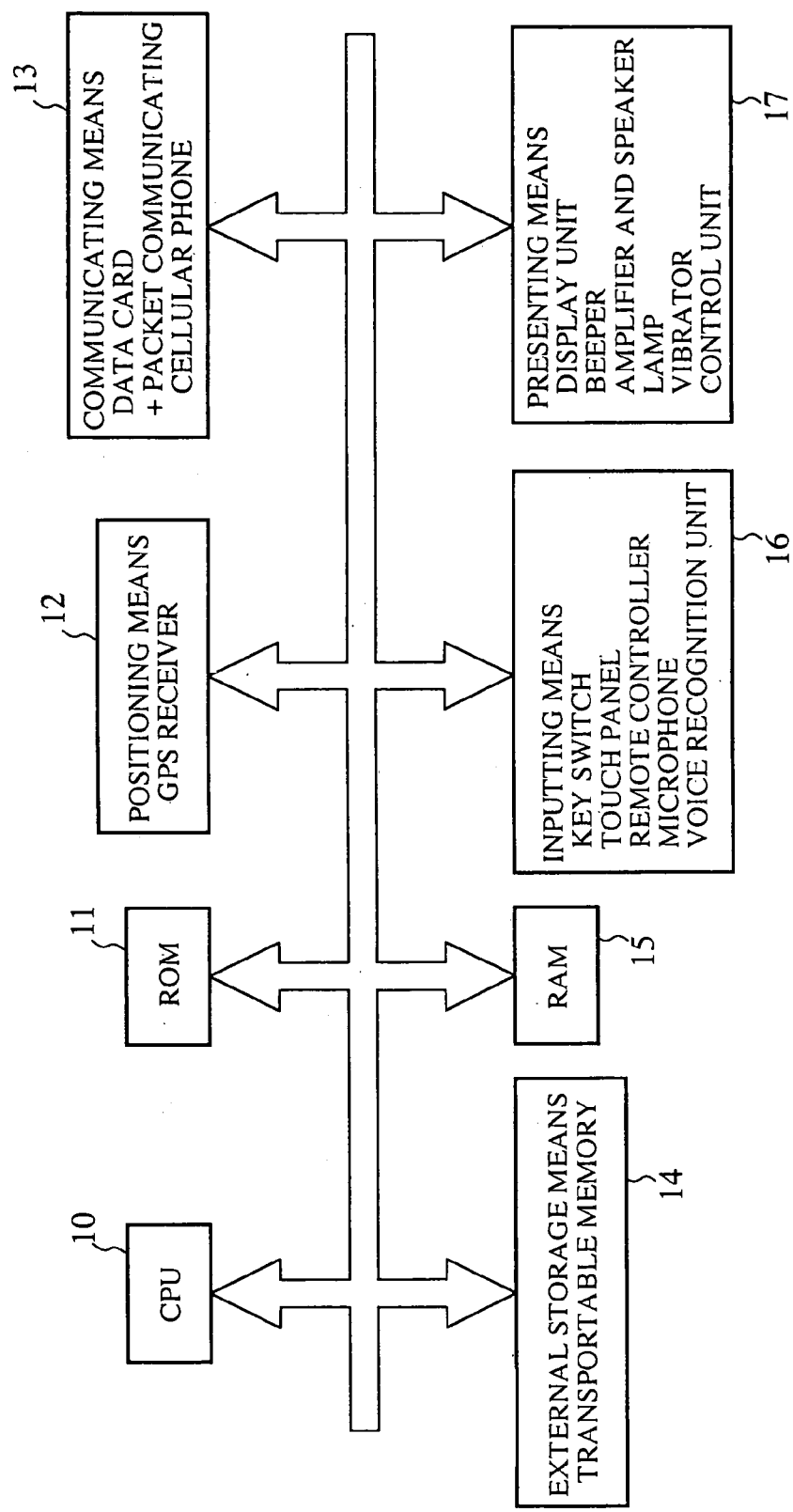
FIG. 3 is a block diagram showing the mobile communication terminal according to the first embodiment of the present invention.
Figure 4:
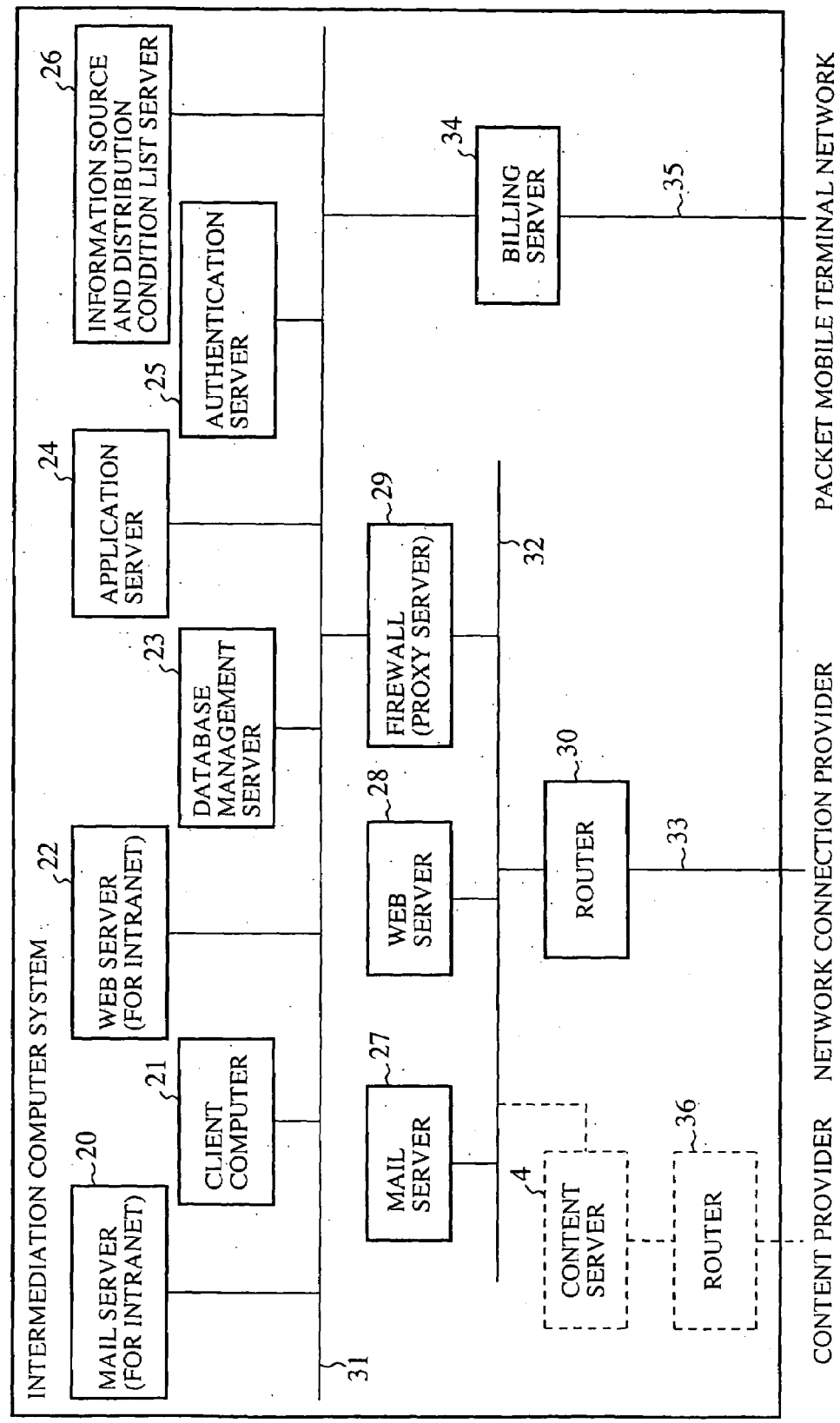
FIG. 4 is a block diagram showing the intermediation computer system according to the first embodiment of the present invention.

FIG. 1 is a block diagram showing a network system according to a location-based information intermediation and acquisition method of the first embodiment of the present invention. FIG. 2 is a flowchart showing operations of a mobile communication terminal, an intermediation computer system and a content server in the location-based information intermediation and acquisition method of the first embodiment of the present invention. FIG. 3 is a block diagram showing the mobile communication terminal according to the first embodiment of the present invention, and FIG. 4 is a block diagram showing the intermediation computer system according to the first embodiment of the present invention.

In FIG. 1, there are shown a portable mobile communication terminal 1 having position detecting means, or a navigation unit having network connecting means, an intermediation computer system 2, a packet exchange mobile communication terminal network 3a, the Internet or an intranet 3b, the content server 4, an application server 5, and a client computer 6. In FIG. 3, there are shown a CPU 10, a ROM 11, positioning means 12 such as a GPS receiver and the like, communicating means 13 comprising a data card and a packet communicating mobile telephone, external storage means 14 such as transportable memory, a RAM 15, inputting means 16 such as a key switch, a touch panel, a remote control unit, a microphone, a voice recognition unit and the like, and presenting means 17 comprising a display unit, a beeper, an amplifier, a loudspeaker, a lamp, a vibrator, a control unit and the like. In FIG. 4, there are shown a mail server 20 (for the intranet), a client computer 21, a web server 22 (for the intranet), a database management server 23, an application server, 24, an authentication server 25, an information source and distributing condition list server 26, a mail server 27, a web server 28, a firewall 29 (a proxy server), routers 30 and 36, networks 31, 32, 33 and 35, and a billing server 34.

Here, it is to be noted that elements shown in dotted boxes are not necessarily needed in the first embodiment. Also, it is to be noted that the content server 4 may be included in the intermediation computer, as shown by a dotted line in FIG. 2.

In the network system shown in FIG. 1, when the intermediation computer system 2 receives any request from any client, that is to say, any mobile communication terminal 1, or any client computer 6 on the Internet/intranet, it proceeds, as shown in FIG. 2, from a request waiting state Step 30 (S30) to a request decoding step S31, and then, depending upon a request decoding result, executes S32 for a menu screen request, S33 for a password screen request, S34 for a user authentication request, or S35 for a static search criteria (unchanging search criteria) registration request. More specifically, in S32, the menu screen is sent to the requesting party (that is the mobile communication terminal in this example), and in S33, an input screen for a user ID and a password is sent to the requesting party. In S34, the user ID and the password is verified against a user data file, and if matched, the user is authenticated and then a session ID is registered in the session ID data file and a static search criteria setting screen is sent (issued) with the session ID to the requesting party. In 535, the request is checked whether it is authorized or not by referring the session ID data file and simultaneously the static search criteria are registered in a static search criteria part in the user data file, and a response indicating that the static search criteria has been registered is sent to the requesting party.

In FIG. 2, a specific mobile communication terminal 1 logs in to a network in S1. More specifically, for example, an action such as dialup connection and password sending to the packet exchange mobile communication terminal network 3a is executed to ensure connection to a wireless line or a higher protocol network.

In S2, via the network, a URL (a residing location) of a specific intermediation computer system 2 is specified and the menu screen is requested from a screen data (web) server 28 of the intermediation computer system 2 to receive and display the menu screen in an HTML format. When the user selects any other service in such menu via an inputting means 16, a process for the other service S3 is executed. When any service item pertinent to the present invention is selected, the input screen for the user ID and the password is requested to the intermediation computer system 2 in S10 and the input screen for the user ID and the password is received.

In S11, the user ID and the password that have been registered-in the user data file of the intermediation computer system 2 in advance for such service are sent to the intermediation computer system 2.

In the screen data server 28 of the intermediation computer system, as described above, in S34, the request is checked (authenticated) whether it comes from an authorized mobile communication terminal (a user) by comparing its user ID and password with ones in the user data file, and if authenticated, the session ID is issued and registered in the session ID data file, and on the other hand, a notification of registration completion (service provision permission) is sent to the requesting party. Also, a static search criteria setting screen is sent (issued) to the requesting party with the session ID.

In S12, static search criteria such as a type (a category) of location-based information that is desired to acquire in the static search criteria selecting screen sent by the intermediation computer system 2 are configured by the user and sent to the screen data server 28 of the intermediation computer system 2.

In the intermediation computer system 2, as described above, in S35, the session ID is authenticated and the static search criteria configured by the user is registered in the static search criteria part in the user data file. Further, the dynamic search criteria (changing search criteria) setting screen is sent to the requesting party.

In S13, the latest position of the mobile communication terminal is detected.

In S14, it is checked whether it is a first-time request for the dynamic search criteria after startup, or it is a request on and after the second time and outside the range specified by the previous requested search criteria. If it is a first-time request or a request outside the range of the previous requested search criteria, new dynamic search criteria are set and sent to the information source and distributing condition list server 26 of the intermediation computer system 2 in S15. If it is the first-time request after startup, certain fixed search criteria, or search criteria specified at the last termination (stored in a flash memory, not shown) is set, and if it is the request on and after the second time, search criteria determined depending upon the search result on the last or previous time(s) are set (that will be described in detail later). In either case, the session ID is sent simultaneously.

When the information source and distributing condition list server 26 of the intermediation computer system 2 receives the service request, it proceeds from a request waiting state (S50) to S51 wherein the request is checked (authenticated) whether it comes from the authorized user or not. If authenticated, in S52, the information source and distributing condition list is created and sent to the mobile communication terminal. The information source and distributing condition list relates to information sources having location-based information that satisfies both the static and dynamic search criteria and lists a series of distribution area information that indicates where the location-based information is distributed or consulted, for example, a distribution center position (coordinates or latitude and longitude) and a distribution radius, distribution true bearing angle information that indicates in which moving direction the distribution to the mobile communication terminal is effective, and the like, which is associated with residing locations of the information sources on the network. The information source and distributing condition list is created from the information source and distributing conditions basic data file by preliminarily editing information source and distributing conditions basic data based upon location-based information (contents) possessed by the content server 4 according to its category and so on in a basic data creating system in the content server 4 on the network (S90), and then uploading the information source and distributing conditions basic data to the information source and distributing conditions basic data file of the intermediation computer system 2 (S91) and selecting or retrieving specific information source and distributing conditions basic data satisfying the search criteria in the information source and distributing conditions basic data file (the retrieving and creating procedure will be described later in detail). The information source and distributing conditions basic data file is data that associates each information source with its residing location on the network and distributing conditions, an example of which is shown in FIG. 5. Further, an example of a resulting information source and distributing condition list is shown in FIG. 6. When such information source and distributing condition list is transmitted in S52, it is typically encoded to a XML format, Alternatively, it may be encoded to any format including an extendible tag format, such as an HTML format and a CHTML format.

Here, the user authentication by the session ID in S51 is performed in S35 for the intermediation computer system by sending an authentication request to the authentication server 25 of the intermediation computer system 2. In this case, in the authentication server 25, for example, a process as shown in a flowchart of FIG. 7 is performed.

Further, when the information source and distributing condition list server and the application server are disposed in a location different from the server comprising the user data file and the session ID data file in a distributed manner, in other words, when these servers are managed/provided by other providers, or when access to these servers is charged and the like, the user authentication by the session ID may be also utilized to check the user's authority. As such, it is to be understood that there is no need to dispose each server in the intermediation computer system centrally, but it may be disposed in a distributed manner.

Here, a case wherein search conditions on and after the second time are set in S14 and S15 will be described with reference to FIG. 8. In FIG. 8, assume that a search-target area is specified as the dynamic search conditions, and more specifically, such search-target area is specified by a circular search area defined by a search center position and a search radius.

Determination in S14 (determination whether it is beyond the search conditions specified at the previous time or not) is shown in the "Determination criteria for requesting timing at present time" box in FIG. 8. More specifically, if the distance $\Delta X_1$ between the present position of the mobile communication terminal and the search center position specified as the search conditions at the previous time (shown as the search center position requested at the previous time), and the distance $\Delta X_2$ defined similarly at the second previous time are both beyond the search radius (shown as the requested search radius) specified together with the search center position multiplied by k (for example, k=0.8), the request is determined to be out of the search conditions and the process proceeds to S15, where new search conditions are transmitted. The new search conditions specify a new search-target area that is an area where the mobile communication terminal should reach by moving a predetermined distance according to the moving history of the mobile communication terminal. When the search-target area is specified by the search center position, the specific search center position included in the new dynamic search conditions set in S15 is shown in the "Search position requested at present time" box in FIG. 8 and the radius of the search-target circle is shown in the "Search radius $R_i$ requested at present time" box in FIG. 8. More specifically, assuming that the mobile communication terminal reaches the present position that is beyond the range within the distance $R_{i-1}$ multiplied by k from the point requested at the previous time, a position that may be reached by advancing by Ri in the same direction is defined as the search center position requested at the present time. On the other hand, the search radius $R_i$ requested at the present time may be defined differently depending upon the number of the information sources N in the information source and distribution condition list that has been received on or before the previous time; for example, if N is smaller than 2, the search radius $R_i$ requested at the present time should be twice as large as the search radius $R_{i-1}$ requested at the previous time; if N is larger than a predetermined maximum value $N_{max}$, $R_i$ should be half the search radius $Ri_{i-1}$ requested at the previous time; and if N is a value between 2 and $N_{max}$, $R_i$ should be same as the search radius $R_{i-1}$ requested at the previous time.

Here, it is to be noted that an expression for the distance between the present position of the mobile communication terminal and the center position of the search range requested at the previous time is shown in the leftmost column in FIG. 8, and symbols representing the search range at the previous and second previous times and the present position are specified in the tables at the lower-left side in FIG. 8.

Further, though it is assumed here that the next search is automatically requested on the basis of the previous search range before the mobile communication terminal leaves the search-target area specified at the previous time, the search may be alternatively requested by specifying the search center position manually unconditionally.

Next, in S16, an information source and distribution condition list (hereinafter referred to as a "list" except specific cases) corresponding to the search conditions newly input in S15 is received and stored in the memory.

In S17, it is checked whether or not the mobile communication terminal lies within the distribution conditions. More specifically, it is checked whether the mobile communication terminal is situated within the distribution area specified by the distribution conditions in the stored list, and whether the moving direction of the mobile communication terminal (calculated from positional transition, for example) is substantially equal (a difference is within ±30 degrees, for example) to the distribution direction specified in the distribution conditions (the true bearing angle that indicates which direction the information source is effective for mobile communication terminals, for example). Here, it is to be noted that the distribution bearing angle may be preset and may not be checked when the mobile communication terminal moves slowly such as in walking. Alternatively, it is possible that the distribution bearing angle is not checked unconditionally.

It is useful to check the moving direction and the distribution bearing angle as described above, for example, when the mobile communication terminal is moving on a road having a median strip where it is useless or even hazardous to provide the location-based information about the opposite lane, and so on. In this case, such checking may be utilized so that, for example, the moving direction check becomes effective synchronously when the moving speed of the mobile communication terminal exceeds a predetermined average speed, or in a preliminary setting of the static search conditions, the user may be registered not as a pedestrian but as in a vehicle, wherein the information about the opposite lane is not provided. Further, the moving direction check may be also applied to the case when the information that is senseless or even hazardous for the vehicle moving in the opposite direction, such as signposting. Still further, the moving direction check may be useful for providing location-based information different from one for the opposite lane only when the user passes a specific position on a specific road.

Figure 9:
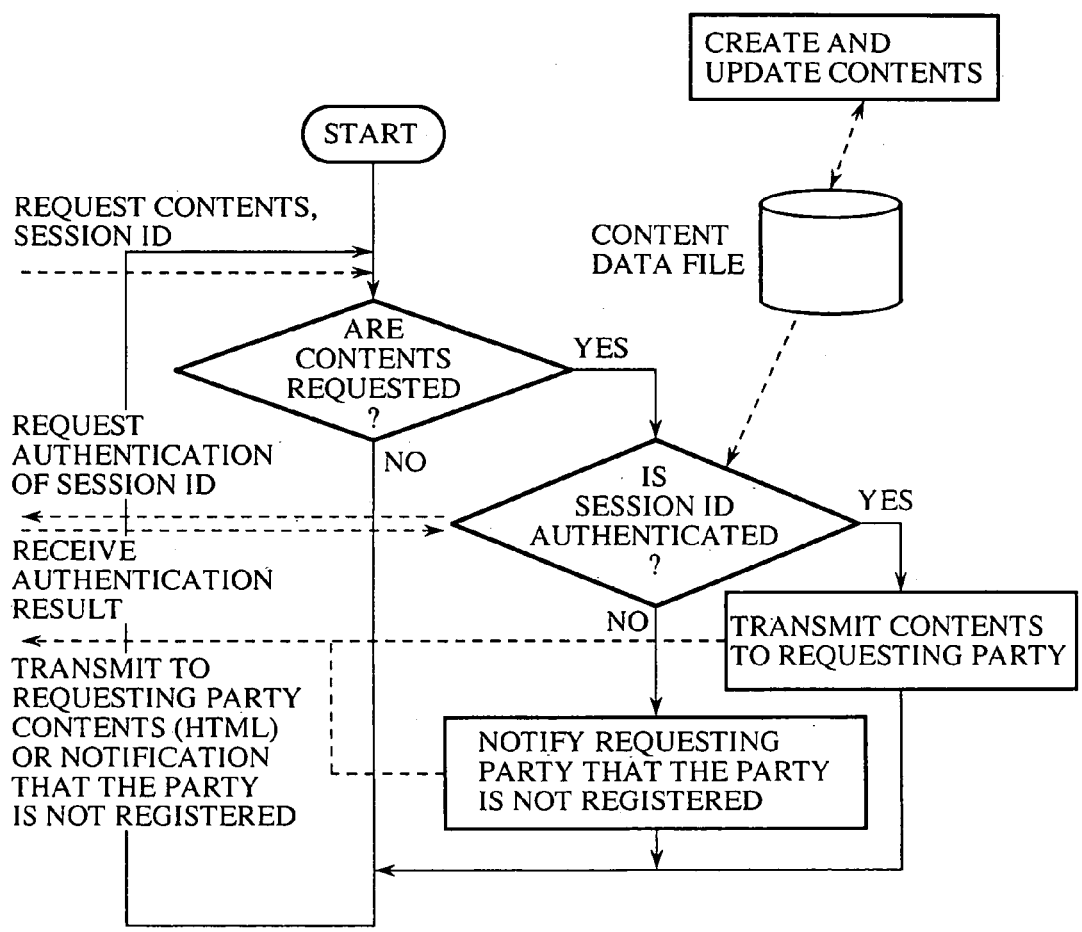
FIG. 9 is a flowchart showing operations for providing contents in the content server according to the first embodiment of the present invention.

If the position of the mobile communication terminal lies within the distribution conditions in S17, the mobile communication terminal ascertains that the location (typically the URL) of the information source on the network corresponding to the distribution conditions is not identical to the previous URL, and then receives the location-based information in the above specific information source that resides in the specific content server 2 on the network by designating the URL by means of a browser and the like. More specifically, in response to the content request from the mobile communication terminal, the specific content server 2 on the network decodes the request and authenticates the session ID in S41. In S42, the content server 2 transmits the location-based information in the specific information source possessed by itself. FIG. 9 is a flowchart showing a process of content distributing services in the content server 4 including a step of requesting the authentication of the session ID to the authentication server.

In S19, the location-based information is reproduced and presented by using an application corresponding to a file type used by the received location-based information either directly or indirectly, such as, for example, a web browser for an HTML file, a content player for a VRML file, and a content viewer for an MPEG file.

Here, if the mobile communication terminal is a navigation unit type, a display is switched partially or completely from the navigation map screen that has been shown till then to the location-based information screen. On the other hand, in the case of a cellular phone type mobile communication terminal, a ringer tone or a vibration may be generated to notify the reception. Further, if the mobile communication terminal does not have the suitable content player or content viewer, it accesses a specific application server to download such application for use.

In S20, it is checked whether the service should be terminated/continued, or the static search conditions should be altered (by the user's manipulation), and if the user wishes the termination of the service, the process from S11 to S21 is terminated. If the user wishes the continuance of the service, the process proceeds to S13, and if the user wishes the alteration of the search conditions, the process proceeds to S12.

An example of the search condition alteration shown in S20 includes a table of contents titles and a specified categorical hierarchy in the information source resulting from the previous search, and a table of categorical classification in the next lower hierarchy, in which the user can select a specific category by using any input means, for example a voice recognition means.

In this case, if the static search conditions are altered to limit the number of the information source in S20, it may be preferable to expand the search range to compensate for such limitation.

If it is determined that the mobile communication terminal is situated beyond the distribution conditions in the S17, the process proceeds to S22, wherein the information source corresponding to such distribution conditions is not accessed. On the other hand, if the location-based information of the corresponding information source has been already accessed and the location-based information is presented, it is determined that the mobile communication terminal has already passed the distribution area, and therefore the presentation of the location-based information is terminated and any screen is displayed instead of such location-based information. For example, if the mobile communication terminal is mainly intended for navigation, a screen for a navigational map is presented. In the case of the voice-announcing type mobile communication terminal, background music is played, for example. In such case, suitable data files are loaded into the memory, and corresponding data reproduction programs such as a player and viewer are executed. Till the next location-based information is received, a mode that reserves the previous screen may be alternatively selected.

Here, if the mobile communication terminal lies in a plurality of distribution conditions in S17, the information source corresponding to either distribution conditions where the mobile communication terminal entered first or checked first may be typically accessed and presented first. Then, after a predetermined time period has passed, the next information source may be accessed, and succeeding information sources may be similarly accessed and presented one after another. In such case, there is a possibility that the presented contents may be changed to the next contents though the user still cannot grasp the contents sufficiently, links to each of the presented contents may be stored so long as the image storing memory can afford to store them so that the user can go back to ascertain the presented contents. Then, the user can return to any previous step by manipulating the return button on the web browser, for example, to ascertain the contents of the location-based information.

As an alternative, when the mobile communication terminal lies in a plurality of the distribution conditions in S17, a title list of the location-based information in the plurality of the information sources may be displayed. The user may select any title in the displayed title list to access the corresponding information source and then the location-based information may be displayed. In such case; the title corresponding to each information source may be added to the contents of the information source and distribution condition list.

Figure 18:
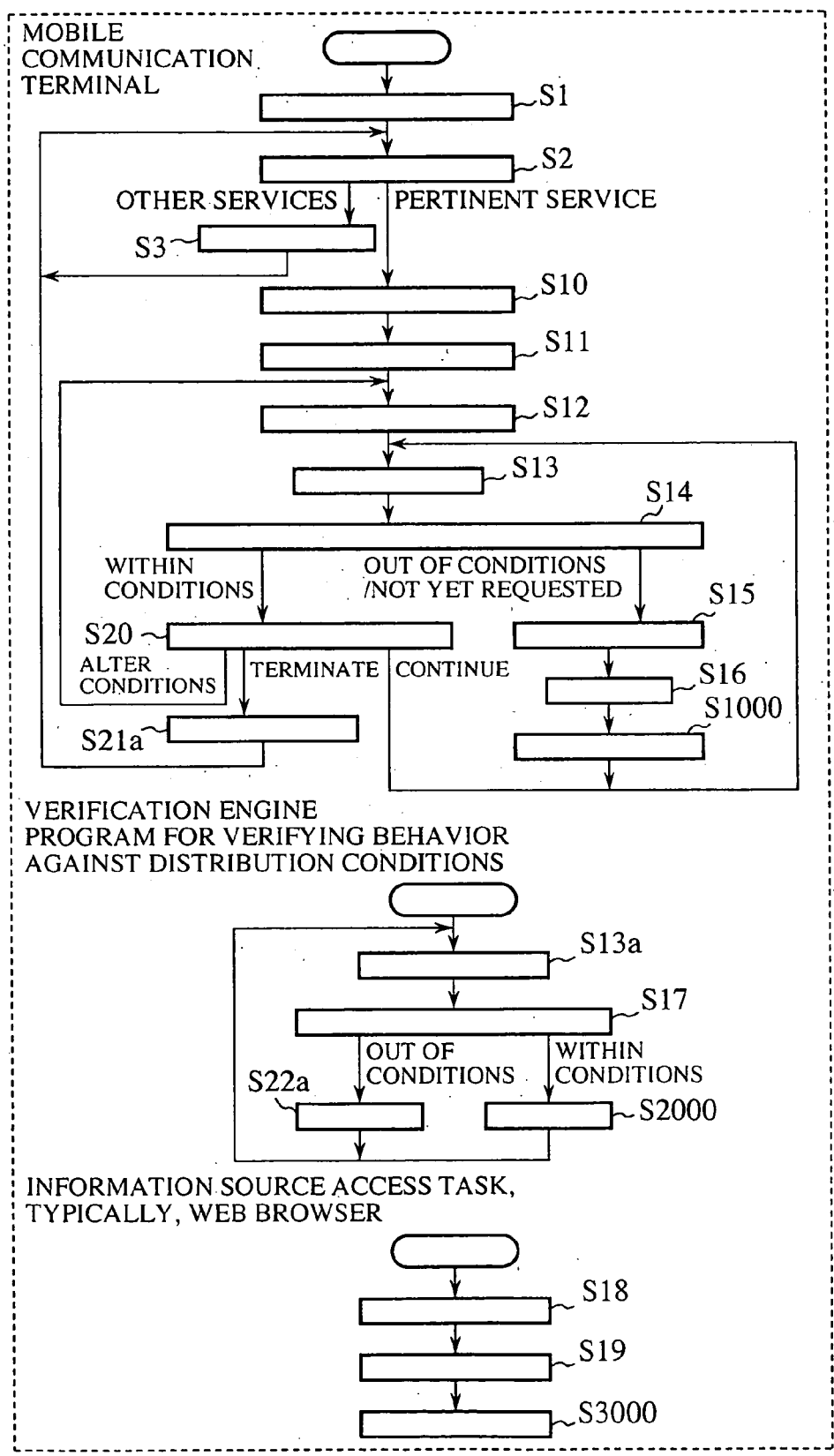
FIG. 18 is a flowchart showing another operation of the mobile communication terminal in the location-based information intermediation and acquisition method of the first embodiment of the present invention.

As another alternative, when the mobile communication terminal lies in a plurality of the distribution conditions in S17, according to a process flowchart as shown in FIG. 18, for example, the plurality of the information sources may be accessed simultaneously in parallel, or the display screen may be rearranged according to the number of access so that the plurality of the location-based information from the plurality of the information sources can be readily seen. That is to say, the plurality of the location-based information of the plurality of the information sources may be displayed on a plurality of the screens separately, and at the same time, the plurality of the screens may be displayed to be viewed together at a time. In each process step shown in FIG. 18, S21a, S1000, S13a, S22a, S2000 and S3000 shown in bold boxes are mainly different from the process described with reference to FIG. 2. More specifically, these process steps in FIG. 18 differ from those in FIG. 2 mainly in that: a verification engine part that is a program to verify the behavior of the mobile communication terminal against the distribution conditions of the information source and distribution condition list is separated as an independent program; the program is initiated in S1000; when the information sources to be accessed appear one after another, the verification engine activates access tasks consecutively for each information source in S2000; the verification engine controls a size, a displayed position, an overlay and so on of the screens for the location-based information received in each of the activated access task in S2000; and the like.

Here, a process shown in FIG. 18 will be described focusing on the steps shown in bold boxes. When the information source and distribution condition list is received and stored in S16, the verification engine is activated if it has not been activated in S2000.

The verification engine detects behavior of the terminal such as a position, a bearing angle and the like (S13a), and verifies the behavior against each distribution condition in the information source and distribution condition list (S17). If the behavior matches up with the distribution conditions, the process of S2000 is executed.

In S2000, if the information source that corresponds to the distribution conditions has not been accessed, the information source is added to a task management table correspondingly. An information source access task (typically a browser) is activated wherein the browser is configured to display screens of a predetermined size in a predetermined position according to the number of tasks in the task management table. Then, the screen size and arrangement of the activated browser is reconfigured.

Figure 19A:
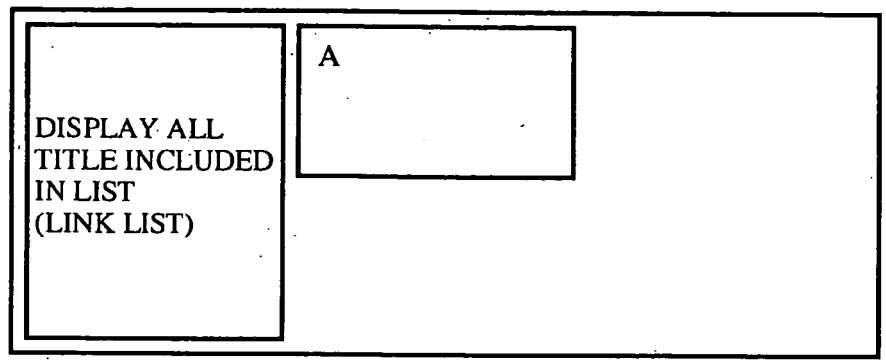
FIGS. 19A–19C are diagrams showing an exemplary indication of a plurality of contents in the mobile communication terminal according to the first embodiment of the present invention.
Figure 19B:
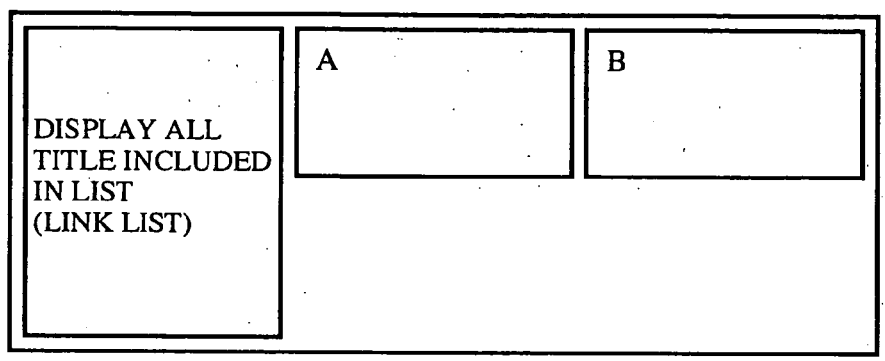
Figure 19C:
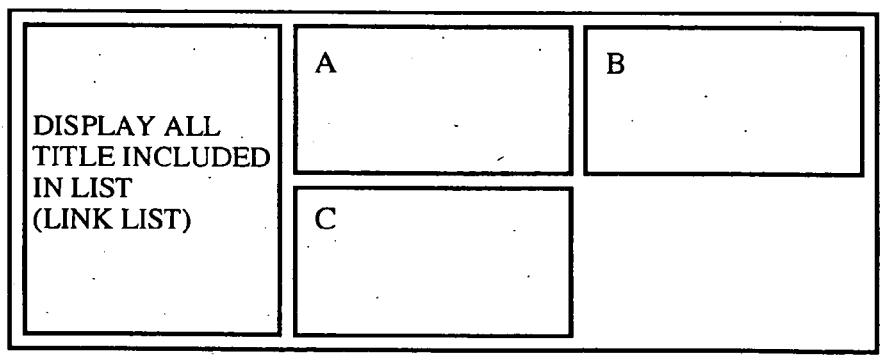
Figure 20A:
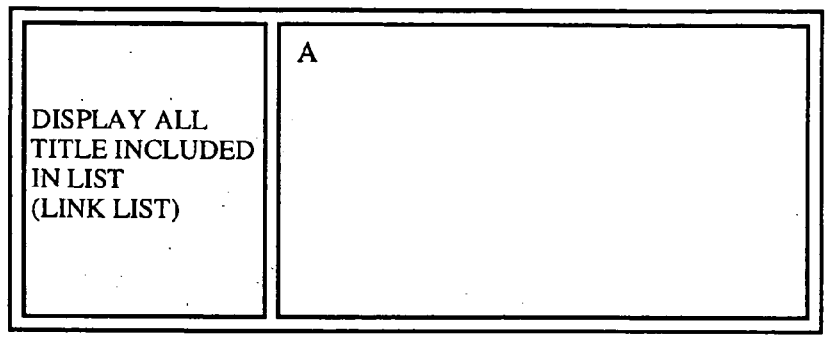
FIGS. 20A–20C are diagrams showing another exemplary indication of a plurality of contents in the mobile communication terminal according to the first embodiment of the present invention.
Figure 20B:
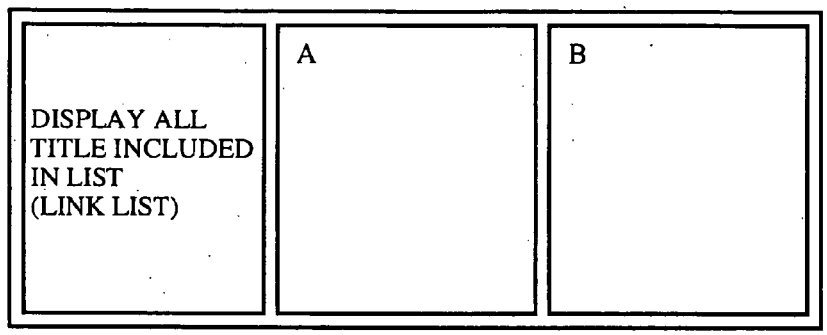
Figure 20C:
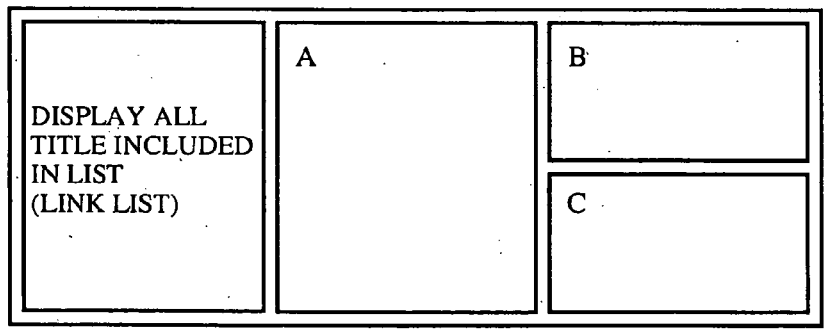

When the behavior does not match up with the distribution conditions in S17, if the corresponding access task (the browser) is active, the task is terminated. If active tasks remain, they are rearranged according to a predetermined rule. FIG. 19 and FIG. 20 show an example of the rule to determine the relationship between the number of images and the rearrangement pattern. FIG. 19A and FIG. 20A each show an example for one screen, FIG. 19B and FIG. 20B each show an example for two screens, and FIG. 19C and FIG. 20C each show an example for three screens.

If each information source to be presented is different from the one presented previously, the information source access task (the browser) accesses the information source to receive the location-based information (S18) and further activates the viewer or the player to display the received screen in the position specified by the verification engine as needed (S19). In S3000, after the screen is displayed, the process is terminated in response to the termination control S22a from the verification engine.

Here, it is to be noted that a plurality of the information access tasks (the browsers) may be activated when a plurality of information sources should be accessed simultaneously in parallel.

Further, in FIG. 18, a session termination request is issued to the server and the verification engine as well as the access task is terminated.

As an alternative, though an example to start/terminate the browser in S2000 is shown in this example, it is to be noted that a plurality of the browsers may be activated in advance so that properties such as a display screen size, arrangement and visible/invisible for each browser may be altered as described above.

As another alternative, when displaying the screen, all titles included in the list may be displayed as shown in FIGS. 19A to 19C and FIGS. 20A to 20C. At this time, if a distribution position of the information source corresponding to the selected title does not coincide with the present position of the mobile communication terminal, such information may be accessed compulsorily by selecting the corresponding title manually.

FIG. 10 is a detailed flowchart of S52 shown in FIG. 2. In this figure, a search hit number counter and the information source and distribution condition list are cleared in S70. The first record of the information source and distribution conditions basic data file is selected to be checked in S71. Then, it is checked whether the static search conditions for the corresponding user in the user data file such as, for example, the category of the search conditions the user desires shown in FIG. 11 coincide with the contents of the first record in S72. If so, then it is checked whether the dynamic search conditions are satisfied, more specifically, for example, whether the search range includes the distribution position of the first record, or whether the search range overlaps with the distribution region in S73. If all the conditions are satisfied, it is determined that the search has hit, and then the hit number counter is incremented in S74. Then, the URLs and distribution conditions of the information source in the record that has been hit are added to the information source and distribution condition list in S75. In S76, it is checked whether the hit number exceeds a predetermined upper limit, and if exceeds, the search is suspended and the process proceeds to S81. If the hit number does not exceed the predetermined upper limit in 576, it is checked whether all the records have been checked in S77. If not, the next record is selected to be checked in S78, and the process is repeated from S72 in the same manner. Here, if the conditions are not satisfied in S72 and S73, the record should not be added to the list, and therefore the process bypasses the steps from S74 to S76 and proceeds to S77. If the determination result is YES in S77, it is checked whether the hit number is less than a predetermined lower limit in S79. If it is less than the lower limit, the search range is expanded by m (for example, m=2) times in S80. Then, the process from S71 is similarly executed as described above. On the other hand, if it is not less than the lower limit in S79, the process proceeds to S81, where the acquired information source and distribution condition list is encoded and sent to the requesting party.

As described above, the intermediation computer system has an effect that it does not have to increase a search volume that consumes search resources and time indiscriminately by suspending the search when the number of the information sources searched according to the search conditions exceeds a predetermined upper limit. On the other hand, the mobile communication terminal has an effect that it does not have to receive a large amount of information about sources that consumes telecommunication resources and costs unnecessarily.

Further, there is an effect that the appropriate number of the information sources can always be acquired by expanding the search-target area if the number of information sources that have been searched according to the search conditions is less than the a predetermined lower limit.

Here, in S52, it is to be noted that if any plurality of the information sources and distribution condition lists have already been filed in the database of the intermediation computer system, a particular list that meets the search conditions may be selected from the plurality of the lists and transmitted to the requesting party.

Figure 21:
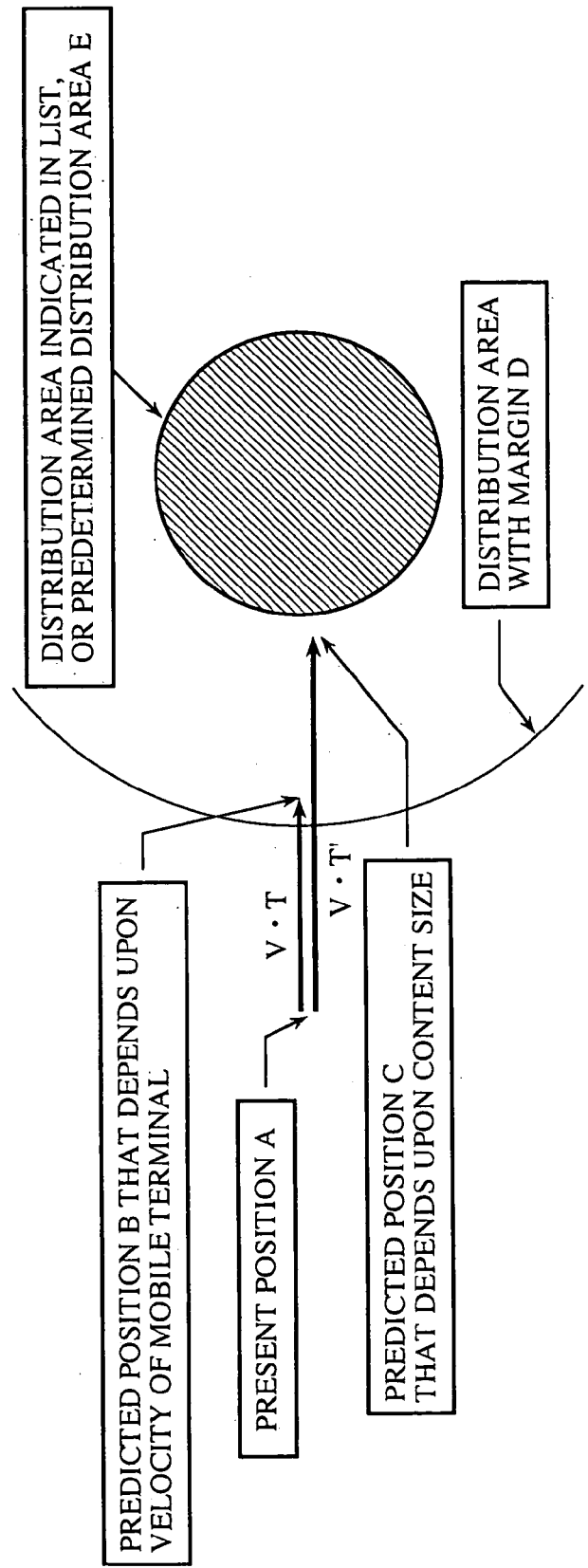
FIG. 21 is a diagram of assistance in explaining a prediction vector according to the first embodiment of the present invention.

Still further, in S17 of FIG. 2, when it is checked whether the present position of the mobile communication terminal lies within the distribution conditions of the acquired list, the predicted position that is predicted based upon the moving history of the mobile communication terminal may be used instead of its present position. Here, such predicted position will be described with reference to FIG. 21. In FIG. 21, when the present position of the mobile communication terminal is designated as A and the moving velocity vector of the mobile communication terminal is designated as V, and it is assumed that the mobile communication terminal continues to move at a speed of V after a predetermined time of T seconds has passed, the predicted position B is calculated by adding a predicted moving vector V·T to the present position A and then it is checked whether the predicted position B lies within the distribution conditions (the distribution area) of the list. Typically, an actual time (that corresponds to the data transfer time) before the location-based information in the content server is displayed after it has been accessed is acquired by measurement and used as the predetermined time T. If the mobile communication terminal has already calculated the velocity vector for other purpose and holds it, it may be used here as it is. If only the present position is detected, the velocity vector is acquired by dividing the difference distance between the present position and the stored past position by the elapsed time for such movement.

As described above, by using the predicted moving vector V·T, the mobile communication terminal has an effect that the access to the information source may be initiated in advance in consideration of the predicted moving vector so that the corresponding location-based information may be presented with appropriate timing.

Still further, in S17 of FIG. 2, when it is checked whether the present position of the mobile communication terminal lies within the distribution conditions of the acquired list, the predicted position C that also depends on the data size may be calculated instead of its present position A for optimal presentation as shown in FIG. 21. In S17, the mobile communication terminal determines a distribution area with a margin (designated as D in FIG. 21) by multiplying a listed value (for example, a distribution radius) specified in the list (or, if it is not specified in the list, a predetermined value) of the distribution area in the distribution conditions for each information source in the list by any or a predetermined value one by one, then checks whether either the predicted position B or the present position A lies within the area. If so, the mobile communication terminal obtains size information of the corresponding contents (the location-based information) via telecommunication means for servers first. In this case, after the mobile communication terminal ascertains that the location (typically the URL, in other words; a particular HTML file or an image file and so on at the content server address) is not identical to the previous URL, only header information of the contents is specified first by means of a request line of the browser and the length of the contents in the received header information (that corresponds to the data size of the contents) is checked. Then, the predicted position depending upon the content size C is calculated according to the data size of the contents. Next, it is checked whether the predicted position C lies within the distribution area of the corresponding contents (that is designated as E in FIG. 21) and if it lies within the area E, the remaining information including the content data may be accessed (browsed) according to the corresponding information about the sources in S18.

Here, it is to be noted that the predicted position C may be determined as follows:

First, the data transfer time T' (in seconds) may be calculated by the following equation, for example, and it depends on the data size, $$T'=(C+D)/R$$

where,

C: a standard size (in bytes) of a header and so on that is independent of contents . . . a typical value determined according to specifications of a used protocol and the like, D: a content data size. (in bytes) . . . acquired by requesting the information about the length of contents described above to the content server, or acquired by requesting the content size information to the intermediation computer, or acquired from the information source and distribution condition list if the data size information is included in the list, and R: a data transfer speed (in bytes/second) . . . a value predetermined based upon statistics and the like. A GUI driver may be installed to set the value manually.

Next, the predicted moving vector may be calculated by the following equation using T', $$S = V \times T'$$

where, $V$ ($=|P_i-P_{i-1}|\Delta t$): a moving velocity vector of the mobile communication terminal (m/sec.),
$P_i$: the position of the terminal at the present time,
$P_{i-1}$: the position of the terminal at the previous time, and
$\Delta t$: a time interval between detection times (sec.)

Further, the predicted position C (the coordinate $P_x$) may be acquired by the following equation, $$P_x = P_0 + S$$

where, $P_0$: the coordinate of the present position of the mobile communication terminal.

Here, in the above calculation, though the predetermined value is used as the data transfer speed R as described above, the data transfer speed may be acquired by learning, for example, according to the following equation using an actual value of the data transfer speed such as for content access and the like, $$R_i = R_{i-1} \times (1-k) + r_i \times k$$

where, $R_i$: a learned value of the data transfer speed,
$R_{i-1}$: a learned value of the data transfer speed at the previous time,
$k$: a learning coefficient ($0<k<1$), for example, 0.03, and
$r_i$: a recent detected value of the data transfer speed, wherein $r_i$=a data size/(data transfer end time–data transfer start time).

As described above, since the predicted position may be altered in consideration of necessary transfer time that depends on the data size, and the contents may be accessed according to the data size, there is an effect that the mobile communication terminal can receive location-based information completely by the time when the information should be presented at the desired distribution area, so that the location-based information may be presented with appropriate timing without a significant delay.

Further, though the predicted vector is altered depending upon the data size in the above example, the distribution area may be altered according to the data size.

Figure 22:
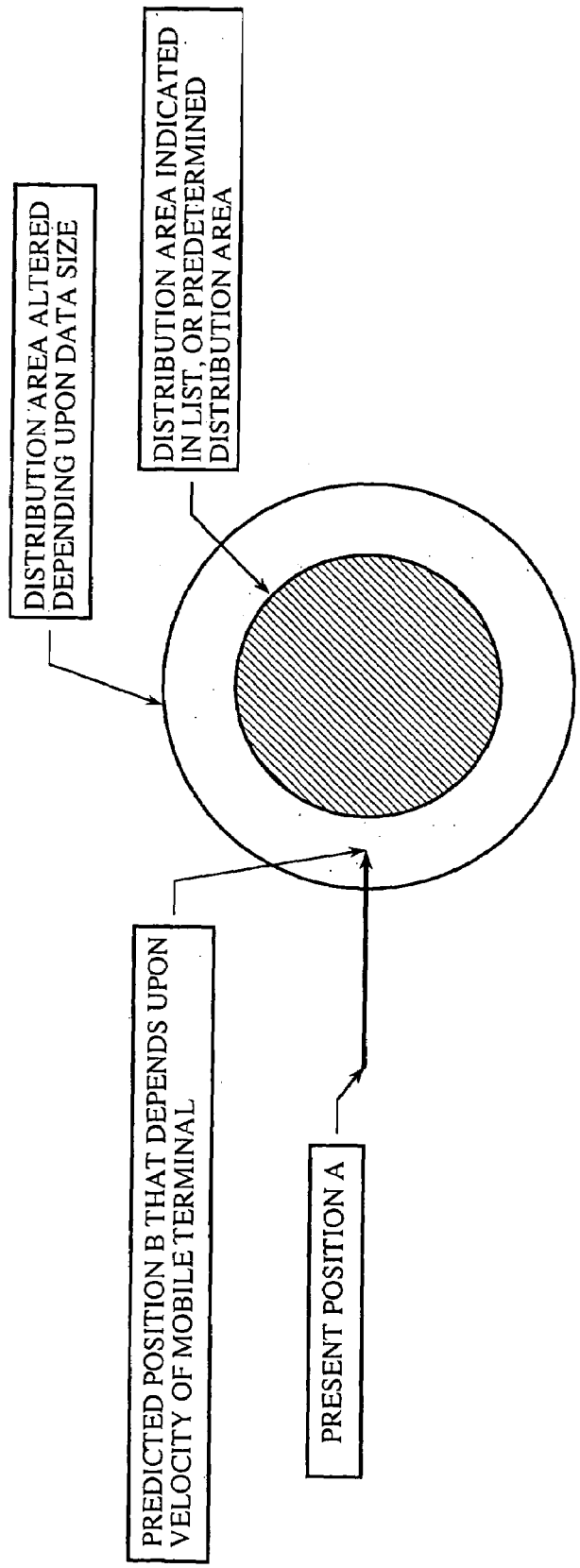
FIG. 22 is a diagram of assistance in explaining a distribution area according to the first embodiment of the present invention.

An example of such variant is described with reference to FIG. 22.

The intermediation computer system comprises content size information about each information source or alternative information such as, for example, range-specific codes determined for each size range in the information source and distribution conditions basic database. In response to the list request from the terminal, it sends the list with the addition of the size information to the mobile communication terminal (S52 in FIG. 2).

In S16 of FIG. 2, the mobile communication terminal receives the information source and distribution condition list with the size information. Next, in S17, the distribution area is altered depending upon the data size rather than a value specified in the list or a predetermined value, as shown in FIG. 22. For example, when the data size is about two times larger than a predetermined reference value S, the distribution radius is defined to be twice as large as the value specified in the list or the predetermined value. When the data size is about half of S, the distribution radius is defined to be half of the value specified in the list or the predetermined value. As shown in FIG. 22, it is checked whether the velocity-dependent predicted position B or the present position A of the terminal lies within the altered distribution area, and if so, contents may be accessed in a way similar to the embodiment described above (S18).

Here, the value specified in the list or the predetermined value may be considered as the minimum or maximum value.

Further, not only the distribution area but also the predicted position B may be altered depending upon the data size in order to use the predicted position C described above.

As described above, since the distribution area may be altered depending upon the data size, more specifically, the distribution area may be expanded when the data size is large or reduced when the data size is small, and the contents may be accessed according to the data size, there is an effect that the mobile communication terminal can receive location-based information completely by the time when the information should be presented at the distribution area so that the location-based information may be presented with appropriate timing without a significant delay.

Further, in a case where the distribution area is altered according to the data size and the presentation is terminated when the movement outside the distribution area is detected, there is an effect that the adequate presentation time may be ensured.

Still further, in a case where the content data size is expressed by codes, there is an effect that the required time for preliminary communication may be reduced. Here, it goes without saying that the distribution position and the position of the terminal may be expressed by particular codes.

Still further, as another case of alteration of the distribution area, the distribution area may be altered depending upon the moving velocity of the mobile communication terminal. In this case, for example, a predicted moving vector length (the absolute value of the predicted moving vector V·T) is calculated depending upon the moving velocity of the mobile communication terminal, then a value of the distribution area acquired from the information source and distribution condition list or a predetermined value of the distribution area is altered in consideration of the predicted moving vector length, then it is checked whether the predicted position B or C, or the present position A lies within the range of the altered distribution area, and then, if so, an operation of S18 is executed. Generally speaking, the larger the predicted moving vector length becomes, the wider the distribution area is made.

Here, it is to be noted that the above case may be used jointly with the case where the distribution area is altered depending upon the data size.

With this configuration, since the distribution area is expanded according to the speed of the mobile communication terminal, there is an effect that the possibility to overlook the distribution area may be reduced significantly especially when the mobile communication terminal mounted on a high-speed vehicle comes along a distribution area that is a narrow region having a radius of 10 m, and that is prepared for pedestrians.

Further, in a case where the distribution area is expanded, it is preferred to configure the timing to present the location-based information and the timing to release the acquired location-based information from the memory as follows. Hereinafter, the operation will be described with reference to FIG. 23.

Figure 23:
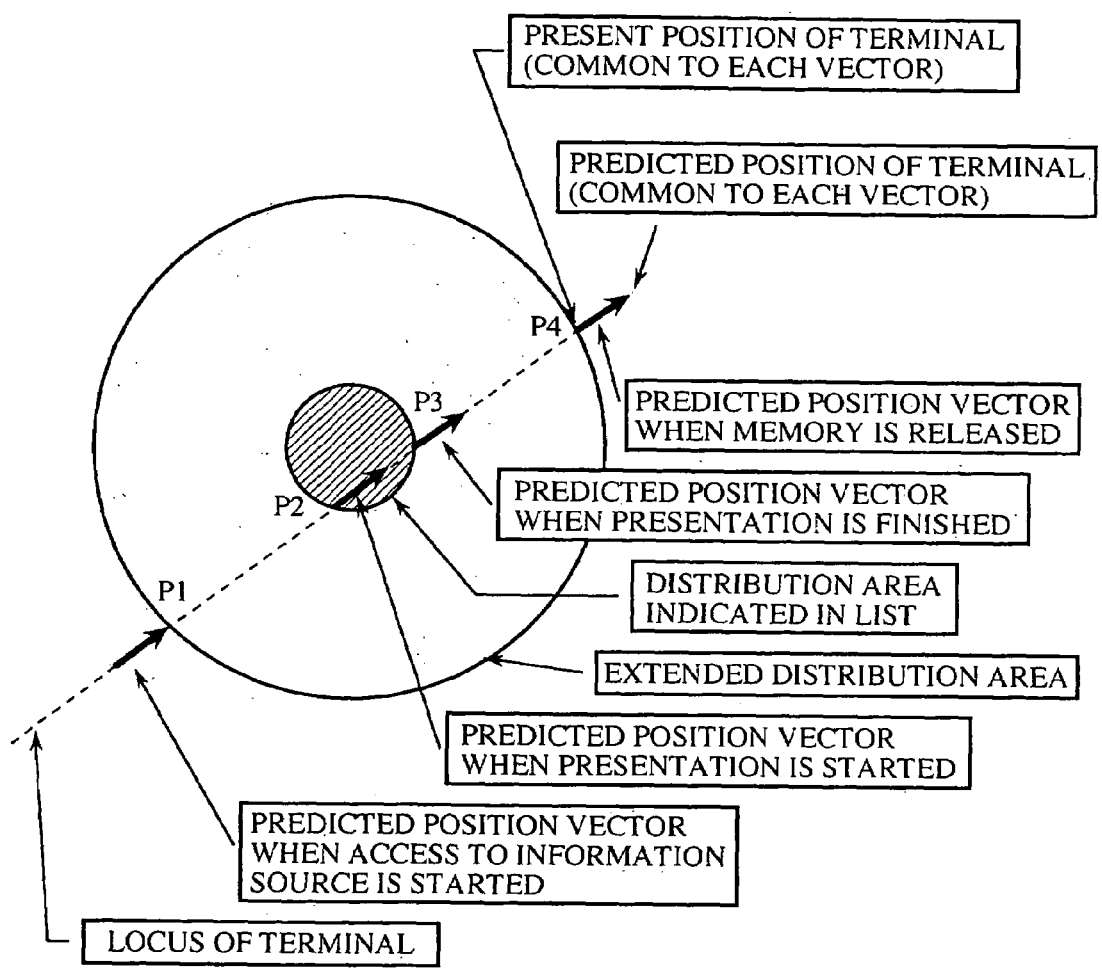
FIG. 23 is a diagram of assistance in explaining timing to present the location-based information and timing to release the acquired location-based information from a memory according to the first embodiment of the present invention.

When the position of the mobile communication terminal (the predicted position B or C of the mobile communication terminal, or the present position A of the mobile communication terminal, the predicted position B in FIG. 23) enters a predetermined range wider than the distribution area (an expanded distribution area), the mobile communication terminal accesses the corresponding information source (a point P1). A memory space management table for the contents is then referenced and the received contents (the location-based information) are stored in the memory space that is "overwritable". In the memory space management table, a region corresponding to the contents (for example, a title of the contents) is then marked as "not overwritable", which indicates that such memory region cannot be overwritten. Here, it is to be noted that the contents are not displayed at least completely soon after the reception has finished. As described above, firstly, the access to the information source is initiated to acquire the contents a little sooner than the present position or the predicted position enters the distribution area (the diagonally shaded area).

Thereafter, when the present position of the mobile communication terminal enters the original distribution area before expansion (the diagonally shaded area), the corresponding contents are presented (a point P2).

Subsequently, when the present position of the mobile communication terminal leaves the distribution area (the diagonally shaded area), the presentation of the contents is terminated (a point P3).

When the mobile communication terminal moves further and the present position of the mobile communication terminal leaves the expanded distribution area that is wider than the original distribution area, the memory space where the corresponding contents are stored is released and the "not overwritable" flag is changed to the "overwritable" flag. This flag is utilized as information to indicate available memory space when the contents are received newly (a point P4). Here, the expanded distribution area delimited by the point P4 may be either the same as the expanded distribution area to determine the start of access at the point P1, or may be another expanded distribution area.

Furthermore, an expansion rate of the expanded distribution area may be altered according to the data size and the speed of the mobile communication terminal described above: more specifically, the distribution area may be expanded by the distance calculated one by one using the moving velocity of the mobile communication terminal and the time required to receive not less than 95% of the content data, for example, which is calculated based upon the actual statistical value of the data transfer time. Alternatively, the expanded distribution area may be defined by expanding the original distribution area at a predetermined rate, for example, by three times.

As described above, there is an effect that the contents may be presented with appropriate timing, since the access to the location-based information is initiated when the present position or the predicted position enters the expanded distribution area, and after the contents have been received, the received contents are presented only when the present position enters the original distribution area that is not expanded. Moreover, there is an effect that the contents may be presented in the distribution area properly and more sophisticated presentation of the contents may be realized even when the contents of a large size are received with a typically available data transfer rate. Furthermore, there is an effect that the problem wherein the base screen is concealed by the received contents before the present position enters the distribution position may be avoided. Also, the substantial distribution area to present the contents may be kept sufficiently small in order to reduce the possibility that the contents are presented simultaneously with other contents.

Further, by utilizing such system, there is an effect that the contents may be presented on the terminal without delay when the contents having information to control passage/stop are provided from the server so that the terminal may be instructed to stop in a predetermined range immediately before entering the gate of a predetermined area if the terminal that would pass the predetermined area has not been authenticated through a communicating procedure performed separately, for example.

Still further, since the memory may be released only when the terminal leaves the expanded distribution area, there is an effect that the buffer memory for content memory may be released and utilized efficiently and moreover, it is no need to receive the contents again when the terminal enters the distribution area a second time. More specifically, though the prior art system that is configured to receive and store all contents in advance must reserve an enormous amount of memory resources to store the contents and also receive an enormous amount of contents all of which may never be utilized in advance, the embodiment described here has an effect that it can present the contents of the information source with less memory resources, without delay and for a sufficiently small distribution area. Further, there is an effect consequently that redundant and enormous contents do not have to be received uselessly when the user of the mobile communication terminal changes the course or the region to which the user has planned to move at the beginning of the movement, and the like.

Here, though there is a possibility that a multiplicity of information sources may be accessed when the distribution area is expanded, in such case, when one information source must be accessed while another information source is accessed, both the information sources may be accessed concurrently at least virtually at least till the reception is completed. In this case, packet communication means plays an important role though it is not described in detail here.

When multiple information sources may be accessed, icons with titles of contents or browser windows with a reduced size which are smaller than regular content presentation windows may be displayed for each accessed information source side by side successively to indicate whether the reception is "in process"/"completed" etc. It allows the user to grasp receiving conditions or to manipulate the icons of the received contents selectively, therefore there is an effect that the contents can be presented either before reaching the distribution area or after passing it till the content memory is overwritten.

Further, small icons with titles of contents of the information source to be accessed may be displayed in an overlap manner (superimposed) at a place on a navigation map display screen corresponding to the distribution area of above information source, wherein there is an effect that the user can readily grasp the receiving conditions and recognize at which position the distribution area is located. Further, by displaying through the small icons or the browser windows with a reduced size, there is an effect that wider displaying range of the base screen is reserved.

As described above, according to the location-based information intermediation and acquisition method of the first embodiment, there is an effect that any of the contents provided by every content server on the network may be utilized as the location-based information and, at the same time, the mobile communication terminal can obtain such location-based information automatically by synchronizing with its movement. Further, there is an effect that every content provider on the network such as the Internet can deliver the location-based information. Still further, there is an effect that the mobile communication terminal can acquire a series of the location-based information and receive the presentation one and after automatically just at the relevant position by synchronizing with behavior of such mobile communication terminal.

Moreover, since selection, retrieval and creation of the information source that would be needed in the future is made by the intermediation computer system in advance, there is an effect that the mobile communication terminal can acquire the information source and distribution condition list about the necessary information sources in advance, therefore the information sources may be accessed without delay.

(Second Embodiment)

Figure 12:
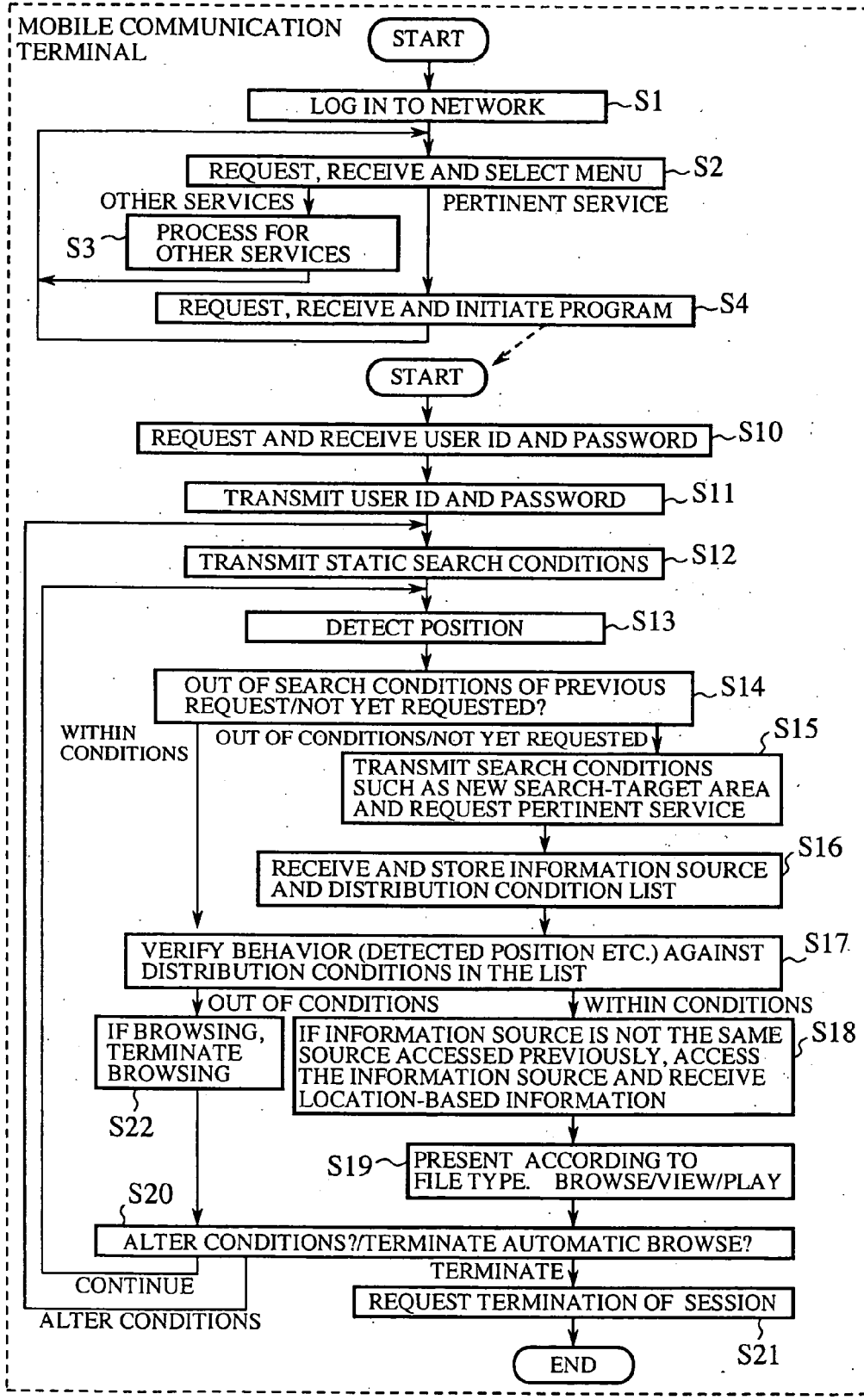
FIG. 12 is a flowchart showing a process of a mobile communication terminal in a location-based information intermediation and acquisition method of a second embodiment of the present invention.

FIG. 12 is a flowchart showing operations of the mobile communication terminal in the location-based information intermediation and acquisition method of a second embodiment of the present invention.

This operation differs from the operation of the mobile communication terminal in FIG. 2 only in that step S4 is added, and a downloaded program halts (ends) when a process of S21 is terminated. Other steps are the same as those described in FIG. 2, and therefore only step S4 is described here.

In the second embodiment, application programs from S10 to S22 are requested to the application server of the intermediation computer system, downloaded and then activated in S4. Here, before downloading, it is checked whether the programs are already possessed and the sufficient memory space is reserved to store and execute the downloaded programs.

Figure 13:
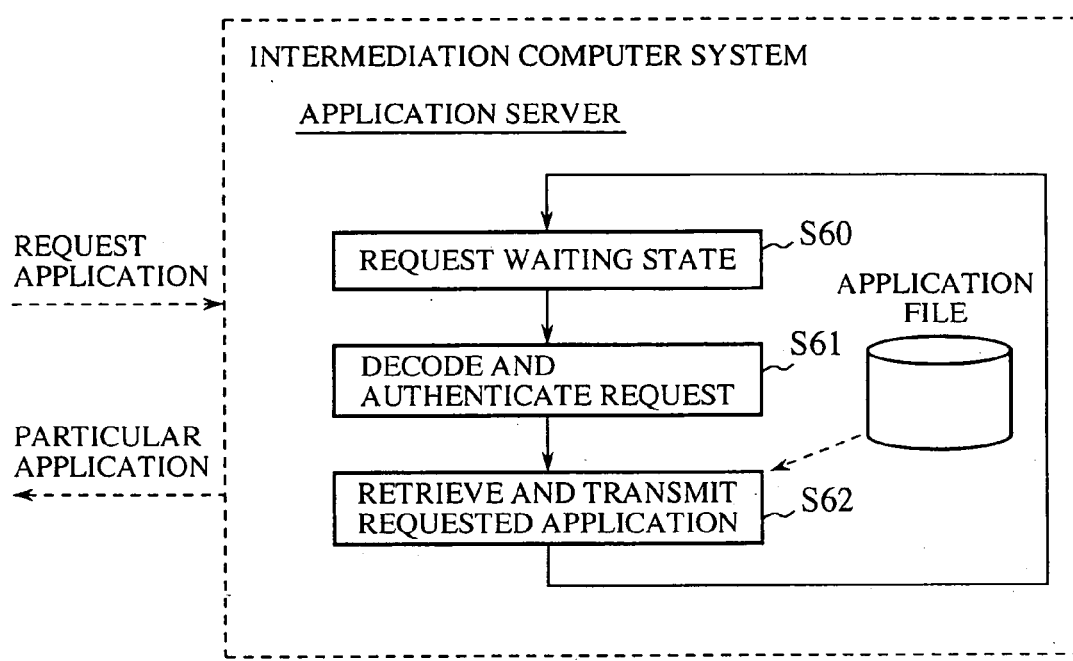
FIG. 13 is a flowchart showing operations of an application server in an intermediation computer system according to the second embodiment of the present invention.

FIG. 13 shows an operation of the application server 24 in the intermediation computer system. The application server 24 is typically in a request waiting state S60, and when requested from the client, it decodes the request (S61) and transmits applications to the requesting party according to the request (S62). If the requesting party is authenticated (not shown), the user is identified using the session ID as shown in the first embodiment.

As described above, there is an effect that limited memory resources of the mobile communication terminal may be used for various purposes including application programs in particular since necessary application programs may be downloaded and activated on each occasion. Also, there is an effect that functions of the mobile communication terminal may be added/modified arbitrarily.

Here, in FIG. 12, if the mobile communication terminal does not have a program for reproducing a data file included in location-based information received from the content server when the mobile communication terminal makes use of such service, the mobile communication terminal may similarly request the application server 24 to send such program, receive and then activate the program.

With this configuration, by downloading and activating necessary programs on each occasion there is an effect that limited memory resources of the mobile communication terminal may be used for various purposes including the data reproduction program. Also, there is an effect that functions of the mobile communication terminal may be added/modified arbitrarily. For example, there is an effect that sound data files may be reproduced by a content player, and image data files may be reproduced by a content viewer.

(Third Embodiment)

In a third embodiment, various types of dynamic search conditions are explained. The dynamic search conditions include the following types:

(1) Conditions that include at least a search center position or a search representative position. As a specific example, the position refers to the latitudinal and longitudinal coordinates in Japanese geodetic system or the latitudinal and longitudinal coordinates in other specified geodetic system and the like. In some applications, the dynamic search conditions may be three-dimensional with the addition of altitude. In this case, there is an effect that a problem wherein location-based information for the ground level is presented on the mobile communication terminal situated on an elevated expressway may be avoided, for example;

(2) Conditions that include a range of a circle, a rectangle and the like that is expressed by a distance or an (latitudinal and longitudinal) angle relative to a search center position or a search representative position; and (3) Conditions that include a moving direction. Such conditions are not used in most applications. Typically, the mobile communication terminal does not send the moving direction as one of the search conditions to the intermediation computer system and the moving direction is checked against the distribution conditions in the mobile communication terminal. However, such search conditions may be applied in some applications so that the moving direction of the mobile communication terminal is sent as one of the dynamic search conditions to the intermediation computer system where, in turn, a list of items that are checked against the moving direction is created and sent to the mobile communication terminal. By doing this, there is an effect that an information source and distribution condition list that is comprised of minimum data from which the data concerning irrelevant directions is filtered out may be acquired.

FIGS. 14A to 14C show examples of the three types of the dynamic search conditions, respectively. When the search conditions are sent from the mobile communication terminal to the intermediation computer system, FIG. 14A shows an example wherein a circular search range, a moving direction of the mobile communication terminal and a contents category are defined as the dynamic search conditions. FIG. 14(b) shows an example wherein a search range having a specified search center position and a content category are defined as the dynamic search conditions, and FIG. 14(c) shows an example wherein a circular search range and a moving direction of the mobile communication terminal are defined as the dynamic search conditions.

Fourth Embodiment

In a fourth embodiment, various types of static search conditions are explained. Examples of the static search conditions include: conditions concerning a particular searched area (for example, an area around the present position of the mobile communication terminal, or any region that is, for example, specified by a place name, and the like), conditions concerning attributes of the searched items (for example, a category, a destination, a distribution time period, and the like), condition concerning attributes of the searching party (for example, target age range, target gender, types of the searching party such as a vehicle (a navigation unit) or a pedestrian, a category of business, and the like) There may be a case wherein all conditions are included. In the case of the static search conditions concerning a particular searched area, when the position of the mobile communication terminal conforms to the distribution area specified for the information source, the information source may be accessed automatically so that its location-based information may be presented automatically. As for the destination, information such as a map or voice guidance to show the way that corresponds to the destination is prepared in a given content server, wherein the positions forward major crossovers are defined as the distribution center positions so that the information may be presented when the mobile communication terminal comes along such crossovers. Moreover, in the case of a category such as a train timetable, when the mobile communication terminal approaches a station, the time for departure of the several trains after the present time that are bound for the destination may be presented in combination with a reception notification signal. As for the distribution time period, it may be used such that, for example, bargain sale information and parking zone information may be presented only during business hours of a particular shop. As for the attributes of the searching party such as the target age range and the like, it functions such that only the information having the contents suitable for the particular searching party may be provided.

Here, it is to be noted that a step of transmitting the static search conditions in S12 and a step of receiving and registering such conditions in S35 may be omitted and a portion or all of the static search conditions may be specified as the dynamic search conditions.

(Fifth Embodiment)

Figure 15:
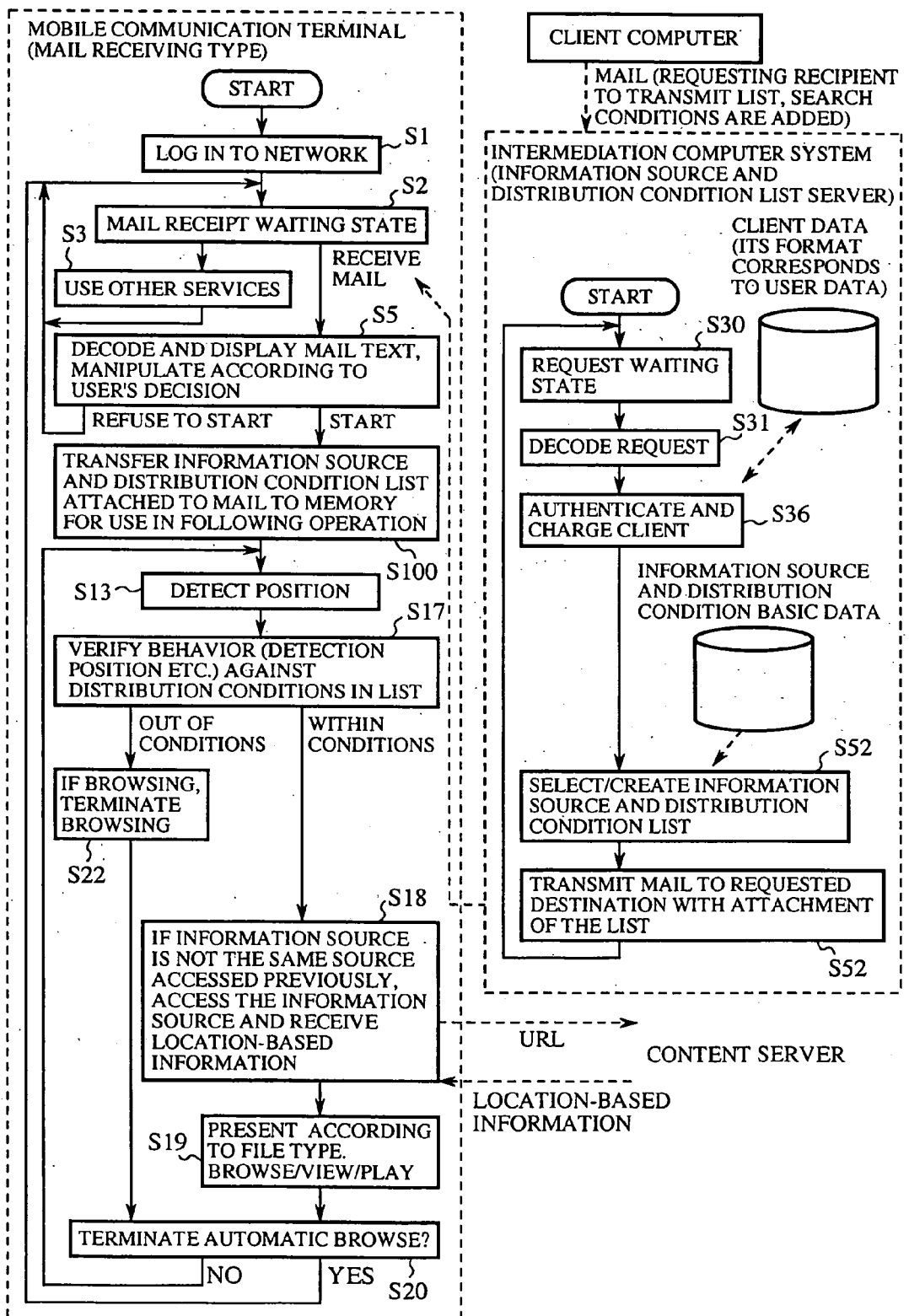
FIG. 15 is a flowchart showing operation of a mobile communication terminal and an intermediation computer system in a location-based information intermediation and acquisition method of a fifth embodiment of the present invention.

FIG. 15 is a flowchart showing operations of a mobile communication terminal and an intermediation computer system in a location-based information intermediation and acquisition method of a fifth embodiment of the present invention.

The intermediation computer system in FIG. 15 operates somewhat differently from that described in FIG. 2. A request is issued by an electronic mail in S31 and as a result of decoding the text of the received mail, it is checked in S36 whether or not the client that has issued the mail is registered as a subscriber of the service with reference to a client data file that corresponds to the user data file in the preceding embodiments. Once the client is authenticated, according to the particular search conditions specified by the client in the mail text, the intermediation computer system selects, retrieves or creates an information source and distribution condition list, and then sends the list to a particular mobile communication terminal specified in the mail text as an attachment of a mail in S52.

On the other hand, as for the mobile communication terminal, the operations executed in steps S1 to S3, S13, S17 to S20, and S22 are the same as those in FIG. 2, respectively, the description of which is omitted. Here, however, S2 shows a state wherein menu selection is waited for after a menu screen has been request and received, or a state wherein the service for receiving the electronic mail and using service intermediation is selected from the menu. Once the mail is received, the mail text is decoded and displayed in S5 and at the same time the user of the mobile communication terminal is asked whether the user wishes the reception of the information source and distribution condition list by such mail, and then if the user refuses the start of the service, the process returns to S2. If the user selects to start the service, in S100, the information source and distribution condition list attached to the mail is transferred to the memory that is used in the operations from S13 to S22. The operations executed from S13 to S22 are similar to those described in FIG. 2, respectively.

With this configuration, in the intermediation computer system, there is an effect that a content server on a network can provide a particular mobile communication terminal with location-based information in response to a request from any client on the network and at the same time, the particular mobile communication terminal can automatically acquire the location-based information as required.

Here, it is to be noted that the fifth embodiment shown in FIG. 15 may be alternatively configured such that the program for the operation from S13 to S22 may be delivered as an attachment of the mail from the intermediation computer system, and then it may be activated in S100 to execute provision of the location-based information.

(Sixth Embodiment)

In a location-based information intermediation and acquisition method according to a sixth embodiment, when the mobile communication terminal is a navigation unit that is connected to the Internet via a wireless telecommunication network, the mobile communication terminal is configured to set the destination and according to route information that is retrieved on a map based on a map database installed therein, define points along the route as a search center position, also define a portion or all of surrounding region up to the destination as a search region, thereby a search-target area being set, and then issue a search request to the intermediation computer system. According to such configuration, there is an effect that the information source and distribution condition list may be acquired for a more proper range and consequently the number of issue of the search request may be reduced.

Further, also when the mobile communication terminal is a navigation unit that is connected to the Internet via a wireless telecommunication network, the mobile communication terminal may be configured to specify the retrieved route information as the search conditions and request the intermediation computer system to provide intermediation support, and the intermediation computer system is configured, in turn, to create the information source and distribution condition list corresponding to the above search conditions and transmit it to the mobile communication terminal. According to such configuration, there is an effect that the information source and distribution condition list for a wider range as far as the vicinity of the destination may be acquired in advance. Further, there is an effect that the information source and distribution condition list may be acquired for a more proper range and consequently the number of issue of the search request may be reduced.

Alternatively, when the mobile communication terminal is not a navigation unit but the intermediation computer system comprises a navigation function, the mobile communication terminal may be configured to send its own present position and destination to the intermediation computer system as the search conditions, and the intermediation computer system is configured, in turn, to search the route from the present position to the destination, create the information source and distribution condition list corresponding to the route according to the retrieved route information and send it to the mobile communication terminal. According to such configuration, there is also an effect that the information source and distribution condition list may be acquired for a wide range as far as the destination in advance. Further, there is an effect that the information source and distribution condition list for a more appropriate range may be acquired, though the less number of parameters are requested from the mobile communication terminal.

(Seventh Embodiment)

In a location-based information intermediation and acquisition method according to a seventh embodiment, the mobile communication terminal specifies representative point information (for example, a search center position) indicating a search area requested at the present time and the representative point information indicating the search area requested at the previous time as the search conditions and notifies the intermediation computer system of the search conditions (and request the intermediation computer system to search the area), and the intermediation computer system, in turn, transmits the information source and distribution condition list created by excluding the search result based upon the previous search conditions from the search result based upon the present search conditions to the corresponding mobile communication terminal. More specifically, in the whole area defined by the representative point information, the information, sources the center position of which is located within the range defined by subtracting the range indicated by the previous representative point from the range indicated by the present representative point may be transmitted to the requesting party, and, on the other hand, the information sources the center position of which is located within the range indicated by both the previous representative point and the present representative point in an overlapping manner may not be transmitted.

According to such configuration, there is an effect that the mobile communication terminal does not have to receive the information sources that are included in the previously specified search area again. Further, there is an effect that an amount of data transferred via the network may not increase unnecessarily.

(Eighth Embodiment)

In a step of transmitting the information source and distribution condition list from the intermediation computer system, when characters, figures or symbols that are representative of an information source or distribution conditions have a shared portion with regard to either the information source or the distribution conditions, which shared portion may be expressed collectively and independently of unshared portion and only the unshared portion may be transmitted correspondingly in a separate manner. According to such configuration, there is an effect that the shared portion in the transmitted data may be bundled together irrespective of the used encoding method and consequently, an amount of transmitted data may be reduced and transfer time and transfer costs may also be kept low.

For example, assuming that the information sources are defined by URLs, when two URLs such as http://www.melcb.co.jp/autob/a.html and http://www.melco.co.jp/autob/b.html are the target information sources, the shared portion http://www.melco.co.jp/autob/may be expressed collectively and, in turn, the unshared portion a.html and b.html may be expressed correspondingly to the respective distribution conditions. As described above, when there are many information sources, there is an effect that the shared portion of the transmitted data may be reduced significantly. With regard to the distribution conditions, when the distribution center point is expressed in latitudinal and longitudinal coordinates, since the higher digits of the latitude and the longitude are always common in the same area, chances to bundle the common portion may be very high, and here there is also an effect that an amount of transmitted data may be reduced. More specifically, there is an effect that data reduction by (the number of information sources−1) times may be accomplished.

(Ninth Embodiment)

The mobile communication terminal according to the first embodiment is configured to check whether its own behavior conforms to the distribution conditions for each information source shown in the information source and distribution condition list received from the intermediation computer system one by one, and, when it conforms, to access the information source corresponding to the distribution conditions unless the distribution conditions have been already accessed; however, when its behavior conforms to the distribution conditions, it may alternatively be configured to check whether the location-based information of the information source corresponding to the distribution conditions is stored in the respective memory by using an management table and the like, so that the mobile communication terminal may access the information source only when the location-based information is not stored. According to the above configuration, there is an effect to avoid waste to access the same information source that has already been stored in the memory again.

(Tenth Embodiment)

In a tenth embodiment, a mobile communication terminal user creates the information source and distribution condition list in advance by using the client computer other than the mobile communication terminal, or such client computer is configured to acquire arbitrary information source and distribution condition list from the intermediation computer and the like in advance, write it to a transportable memory (a memory card) by transportable, memory writing means, read the list written in the transportable memory by memory reading means. (not shown) on the mobile communication terminal. After that, the mobile communication terminal performs the steps just as shown in FIG. 15.

With the above configuration, when the information source and distribution condition list has a large size, there is an effect that such list may be acquired using a wired link, without wasting wireless communication costs. Further, there is also an effect that, suiting the preferences of the user, a category, distribution conditions and the like may be altered only by interchanging the transportable memory.

(Eleventh Embodiment)

The intermediation computer system may alternatively be installed in a gateway between a packet transmission mobile communication terminal network and the Internet so that it can monitor an amount of transmitted packets to perform billing operation depending upon the amount of the packets and issue a billing report.

Figure 16:
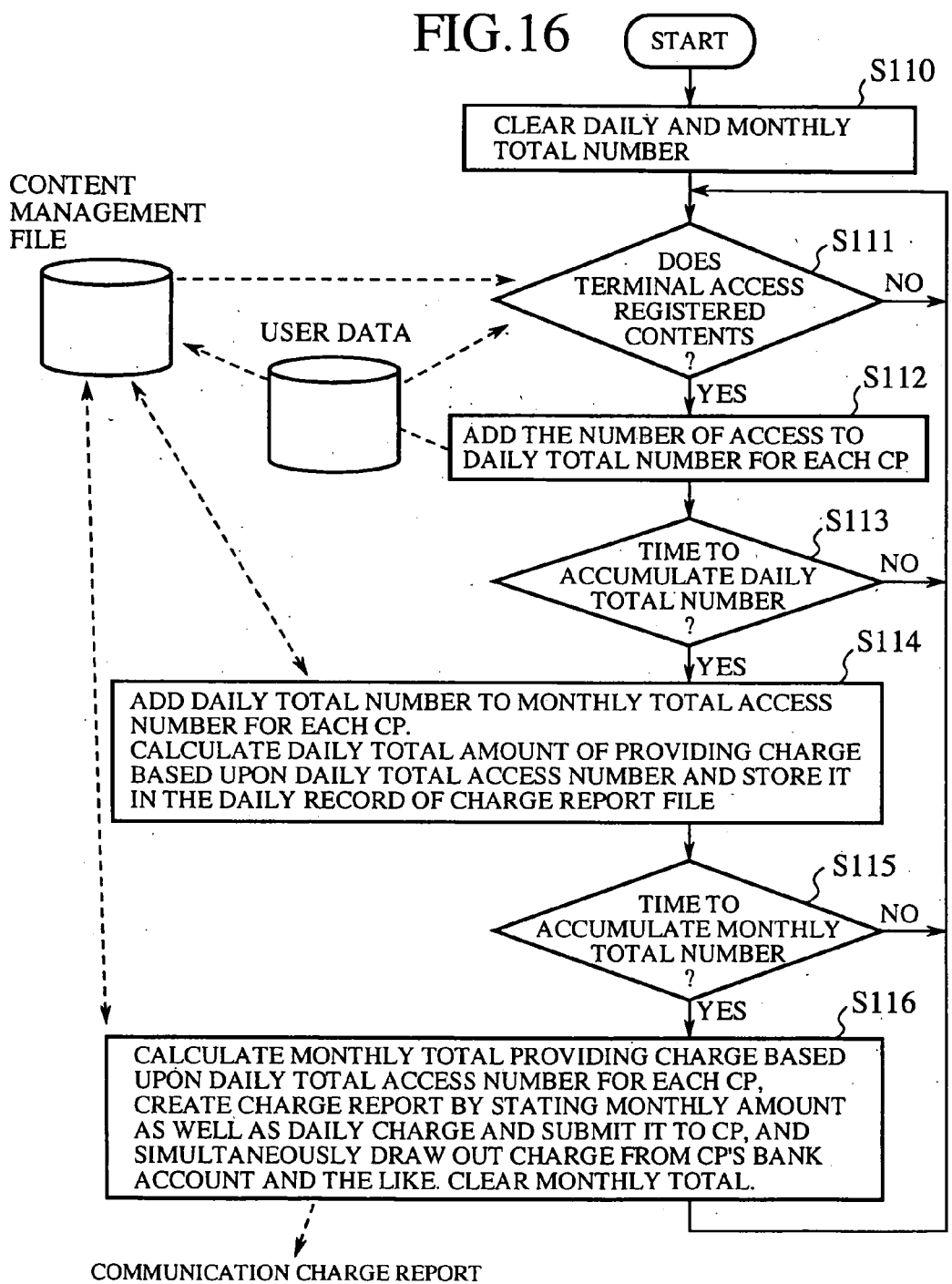
FIG. 16 is a flowchart showing a billing process in a location-based information intermediation and acquisition method of an eleventh embodiment of the present invention.

According to a location-based information intermediation and acquisition method of the eleventh embodiment, the billing server 34 in the intermediation computer system is configured to bill content providers every time the registered mobile communication terminal (the user) accesses predetermined registered contents or according to the number of access. FIG. 16 is a flowchart showing operations in the eleventh embodiment. In this case, it is to be noted that the intermediation computer system 2 including the billing server 34 is installed at a connection point with the mobile communication terminal network 3a. Therefore, all mobile communication terminals (for example, packet communication cellular phones+GPS receivers) can access the content server 4 on the Internet/the intranet 3b through this point.

In FIG. 16, first, variables are cleared in S110. In S111, it is checked whether or not the mobile communication terminal has accessed the registered content servers. For example, the conformity with the registered contents is checked by using source addresses and destination addresses in Internet Protocol layer, a corresponding data file of an ID number and an IP address of the mobile communication terminal (not shown), and the like. If the mobile communication terminal has accessed the registered content servers, the number of access is added to a daily total number for each content provider (CP) in S112. In S113, it is checked whether the time to accumulate the daily total number has come, and if the time has come, the daily total number is recorded in a charge report file in S114. The daily total access number is then added to the monthly total access number for each content provider. In S115, it is checked whether the time to accumulate the monthly total number has come. In S116, a monthly total providing charge is calculated based upon the daily access number for each content provider, and the charge report where the monthly total providing charge is stated with the daily total charge is created and submitted to each CP, and at the same time, the monthly total providing charge is paid from the bank account or other account and the monthly total is cleared.

With the above configuration, there is an effect that a predetermined charge may be billed from the content providers who expect a profit by providing mobile communication terminals in a distribution area with contents.

(Twelfth Embodiment)

Figure 17:
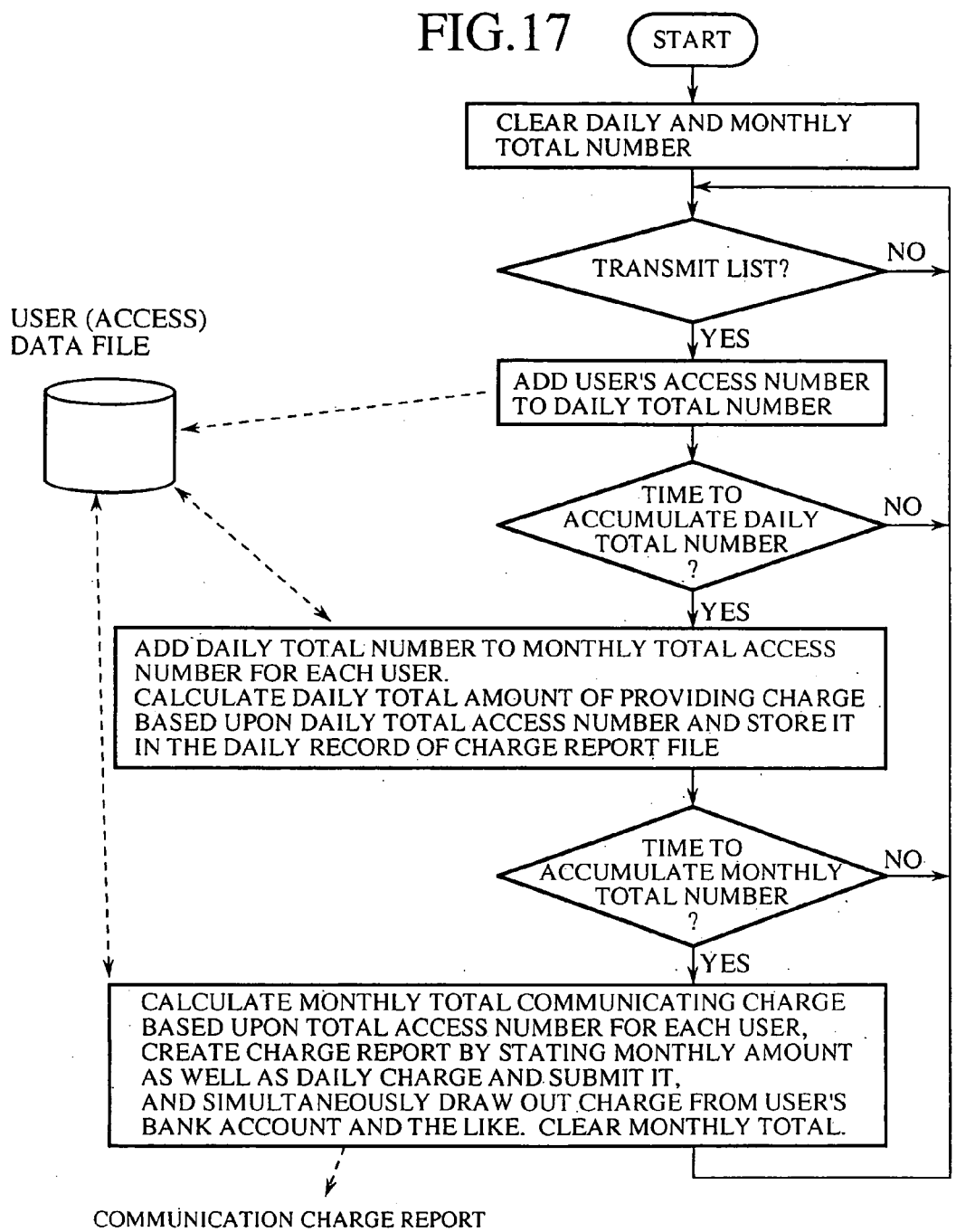
FIG. 17 is a flowchart showing a billing process in a location-based information intermediation and acquisition method of a twelfth embodiment of the present invention.

FIG. 17 is a flowchart showing a method for billing the mobile communication terminal depending upon the number of access wherein the mobile communication terminal requests and receives the information source and distribution condition list in the location-based information intermediation and acquisition method according to a twelfth embodiment. In this embodiment, the mobile communication terminal may be charged based upon the number of the information source and distribution condition list received by the mobile communication terminal with the addition of the number of access.

Though the mobile communication terminal is charged in the embodiment shown in FIG. 17, it is to be noted that the client that utilizes the intermediation service may alternatively be charged.

With the above configuration, there is an effect that a predetermined charge may be billed from the client or the mobile communication terminal user that uses the location-based information providing service or the intermediation service to provide the location-based information.

(Thirteenth Embodiment)

In a thirteenth embodiment, a portion of data transfer in the download direction in the network is provided by Broadcast Satellite (BS) digital data broadcasting, as shown in FIG. 1. In this case, there is an effect that the location-based information or the information source and distribution condition list may be provided to multiple mobile communication terminals scattering in a wide range simultaneously and quickly.

(Fourteenth Embodiment)

In a fourteenth embodiment, the mobile communication terminal is configured to comprise network connecting means by DSRC (Dedicated Short Range Communication) and, on the other hand, a plurality of DSRC transmitting and receiving means is implemented on the network side. The plurality of DSRC transceivers on the network side is disposed along the road.

Each of the DSRC transceivers on the network side communicates with the mobile communication terminal irrespective of the physical location of a transmittable/receivable area for each DSRC transceiver, so that the location-based information that satisfies the distribution conditions, on the basis of the position detecting result of the mobile communication terminal rather than the position detecting (communication detecting) function of the DSRC transceiver is provided or acquired by way of the DSRC transceiver (the position detecting function of the DSRC transceiver may also be used in combination).

With the above configuration, there is an effect that both the position detection accuracy of the mobile communication terminal and the high-speed property of the DSRC communication may be utilized efficiently to provide or acquire the location-based information.

(Fifteenth Embodiment)

In a fifteenth embodiment, the intermediation computer system is configured to comprise data encoding means and, on the other hand, the mobile communication terminal is configured to comprise decoding means to decode the encoded data.

In this case, there is an effect that a risk that the data needing secure concealment is cracked easily and used for evil purposes on the network may be reduced.

(Sixteenth Embodiment)

In a sixteenth embodiment, a code specifying a format to express the search conditions in themselves or the information source and distribution condition list (for example, <H> for an HTML format and <X> for an XML format) is included in the search conditions.

In this case, there is an effect that a wide variety of methods for specifying the search conditions or the information source and distribution condition list may be used.

Further, types of the search conditions (for example, the types as shown in FIGS. 14A, 14B and 14C may also be specified in the search conditions. In this case, the intermediation computer first checks the type and then decodes the search conditions. By doing so, there is an effect that a wider variety of the search conditions may be accommodated.

(Seventeenth Embodiment)

In a seventeenth embodiment, the content server is installed not on an open site on the Internet but on an closed site such as on a LAN to which the intermediation computer system belongs. In this case, there is an effect that the authenticating step may be omitted, various files may be read or written directly, quality of contents may be readily monitored, and the like.

(Eighteenth Embodiment

In each of the above described embodiments of the present invention, the intermediation computer system may also be configured to monitor statistics such as an access frequency by location of mobile communication terminals or an access frequency to each of the contents in order to make use of the statistics for enriching or renovating the contents.

(Nineteenth Embodiment

In a location-based information intermediation and acquisition method according to a nineteenth embodiment, the mobile communication terminal is combined to the motion control system of a vehicle to control the motion of the vehicle based upon the location-based information for controlling the vehicle. In this case, for example, a plurality of vehicles equipped with the mobile communication terminals may be provided with the command (the location-based information) depending upon each present position to move uniquely to each location. More specifically, it may be utilized for control of a group of vehicles distributed in a wide area.

For example, as an application of the location-based information intermediation and acquisition method according to the present invention, for consumer use, for example, a route for avoiding a traffic jam may be specified dynamically for each location by altering contents of the content server also dynamically depending upon commands. In a taxi application, for example, a group of taxis may be directed to a region where a usage frequency is high.

When the mobile communication terminal is a cellular phone equipped with the position detecting means, a task to guide a user-pedestrian to a specific place may be attained by presenting location-based information (a destination guide) at important points.

In the field of aircraft, when an aircraft enters a specific airspace, operational instructions may be presented for the airspace. Otherwise, precautions for the airspace may be presented. When the aircraft enters the airspace where any danger is warned, an alarm may be issued and then the aircraft may be controlled to obviate the danger. Moreover, when the aircraft reaches the airspace, the next direction may be instructed and subsequently, flying direction may be changed successively automatically.

In an agricultural field, tractors may be instructed to perform appropriate driving control at each point to achieve automatic driving.

INDUSTRIAL APPLICABILITY

The location-based information intermediation and acquisition method according to the present invention may be applied not only to provide desired location-based information but also to administer a group of vehicles in a wide area, guide the vehicles on a route, control operations of the vehicles and the like.

The invention claimed is:

1. A location-based information intermediation and acquisition method in which an intermediation computer system on a network intermediates location-based information provided on said network and a mobile communication terminal on said network acquires the desired location-based information that synchronizes with behavior of the mobile communication terminal through the intermediation, comprising:

in said intermediation computer system, transmitting to said mobile communication terminal over the network an information source and distribution condition list that associates a location on the network of an information source having the location-based information that corresponds to specific search conditions with distribution conditions that include a distribution area of said location-based information; and in said mobile communication terminal, verifying behavior of said mobile communication terminal against the distribution conditions of the information source indicated in said received information source and distribution condition list, for each information source, and then receiving and presenting the location-based information by accessing the verified information source.

2. A location-based information intermediation method, comprising transmitting to a mobile communication terminal an information source and distribution condition list that associates a location on a network of an information source having predetermined location-based information that corresponds to specific search conditions with distribution conditions that include a distribution area of the location-based information.

3. A location-based information intermediation method according to claim 2, further comprising, when receiving a request to transmit the information source and distribution condition list concerning predetermined location-based information to a specified mobile communication terminal by specifying a search condition from an arbitrary client computer over the network, transmitting the information source and distribution condition list to said specified mobile communication terminal.

4. The location-based information intermediation and acquisition method according to claim 1, wherein the intermediation computer system additionally transmits distribution bearing angle information that limits a moving direction of the mobile communication terminal as one of the distribution conditions in the information source and distribution condition list to the mobile communication terminal; and said mobile communication terminal verifies the moving direction of said mobile communication terminal against the distribution bearing angle in the information source and distribution condition list, and accesses the information source that conforms to the distribution conditions to receive the location-based information for presentation.

5. A location-based information acquisition method, comprising:

receiving from outside an information source and distribution condition list that associates a location on a network of an information source having predetermined location-based information with distribution conditions that include a distribution area of the location-based information; and verifying, for each information source, behavior of a mobile communication terminal including a location thereof against the distribution conditions of the information source indicated in the information source and distribution condition list received, and then receiving and presenting the location-based information by accessing the verified information source.

6. A location-based information acquisition method, comprising:

requesting an intermediation computer system to provide intermediation support in connection with predetermined location-based information while attaching search conditions for the location-based information provided on a network;

receiving an information source and distribution condition list that associates a location on a network of an information source having the predetermined location-based information with distribution conditions that include a distribution area of the location-based information from said intermediation computer system via the network; and verifying, for each information source, behavior of a mobile communication terminal including a location thereof against the distribution conditions of the information source indicated in the information source and distribution condition list received, and then receiving and presenting the location-based information by accessing the verified information source.

7. The location-based information acquisition method according to claim 6, wherein the search conditions are updated automatically as the mobile communication terminal moves.

8. The location-based information acquisition method according to claim 6, further comprising presenting a screen for inputting the search conditions, wherein the search conditions are specified through said screen to request provision of intermediation support.

* * * * *